United States Patent
Kang et al.

(10) Patent No.: US 11,924,025 B2
(45) Date of Patent: Mar. 5, 2024

(54) METHOD FOR PERFORMING BEAM FAILURE DETECTION IN WIRELESS COMMUNICATION SYSTEM AND APPARATUS THEREFOR

(71) Applicant: LG ELECTRONICS INC., Seoul (KR)

(72) Inventors: Jiwon Kang, Seoul (KR); Eunjong Lee, Seoul (KR); Heejeong Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 473 days.

(21) Appl. No.: 17/266,959

(22) PCT Filed: Aug. 9, 2019

(86) PCT No.: PCT/KR2019/010076
§ 371 (c)(1),
(2) Date: Feb. 8, 2021

(87) PCT Pub. No.: WO2020/032685
PCT Pub. Date: Feb. 13, 2020

(65) Prior Publication Data
US 2021/0314218 A1    Oct. 7, 2021

Related U.S. Application Data

(60) Provisional application No. 62/716,937, filed on Aug. 9, 2018.

(51) Int. Cl.
*H04L 12/26* (2006.01)
*H04L 5/00* (2006.01)
(Continued)

(52) U.S. Cl.
CPC ........ *H04L 41/0677* (2013.01); *H04L 5/0048* (2013.01); *H04W 24/08* (2013.01); *H04W 72/23* (2023.01)

(58) Field of Classification Search
CPC ... H04L 41/0677; H04L 5/0048; H04L 5/001; H04L 5/0053; H04L 27/0006;
(Continued)

(56) References Cited

U.S. PATENT DOCUMENTS 8,510,433 B2    8/2013    Ramachandran et al.
10,764,932 B2 *  9/2020    Nagaraja ........... H04W 74/0841
(Continued)

FOREIGN PATENT DOCUMENTS

KR    1020160120250    10/2016
WO    2017123060    7/2017

OTHER PUBLICATIONS

PCT International Application No. PCT/KR2019/010076, International Search Report dated Dec. 4, 2019, 6 pages.

*Primary Examiner* — Phuongchau Ba Nguyen
(74) *Attorney, Agent, or Firm* — LEE, HONG, DEGERMAN, KANG & WAIMEY

(57) ABSTRACT

Disclosed are a method for performing beam failure detection in a wireless communication system and an apparatus therefor. Specifically, a method for performing beam failure detection by means of a user equipment (UE) in a wireless communication system comprises the steps of: receiving a reference signal (RS) from a base station; determining whether a beam fails by measuring the reference signal; and transmitting, to the base station, the determination result on whether the beam fails, wherein by separating a case i) in which the base station does not transmit the reference signal from a case ii) in which the quality of the reference signal transmitted by the base station does not satisfy a specific threshold range, the step of determining whether the beam
(Continued)

fails may be determined to be a beam failure only in the case ii).

12 Claims, 17 Drawing Sheets

(51) Int. Cl.
  *H04L 41/0677*      (2022.01)
  *H04W 24/08*        (2009.01)
  *H04W 72/23*        (2023.01)

(58) Field of Classification Search
  CPC ... H04L 27/261; H04L 43/50; H04L 12/2697; H04L 43/00; H04L 12/2602; H04W 24/08; H04W 72/23; H04B 7/0695; H04B 7/088; H04J 3/14
  See application file for complete search history.

(56) References Cited

U.S. PATENT DOCUMENTS

| | | |
|---|---|---|
| 2015/0146674 A1 | 5/2015 | Krishnamurthy et al. |
| 2017/0207843 A1* | 7/2017 | Jung .................... H04W 74/006 |
| 2017/0215117 A1* | 7/2017 | Kwon .................... H04W 36/32 |
| 2017/0303264 A1 | 10/2017 | Islam et al. |
| 2017/0303265 A1* | 10/2017 | Islam .................... H04B 7/0695 |
| 2018/0191422 A1* | 7/2018 | Xia ........................ H04B 7/061 |
| 2019/0075014 A1* | 3/2019 | Zhou .................... H04W 74/0833 |
| 2019/0089579 A1* | 3/2019 | Sang .................... H04W 40/16 |
| 2019/0090143 A1* | 3/2019 | Luo ...................... H04B 7/0617 |
| 2021/0083751 A1* | 3/2021 | Chen .................... H04W 24/10 |
| 2022/0294514 A1* | 9/2022 | Kang .................... H04L 5/0051 |
| 2023/0082579 A1* | 3/2023 | Kang .................... H04B 7/088 370/329 |

* cited by examiner

[FIG. 1]
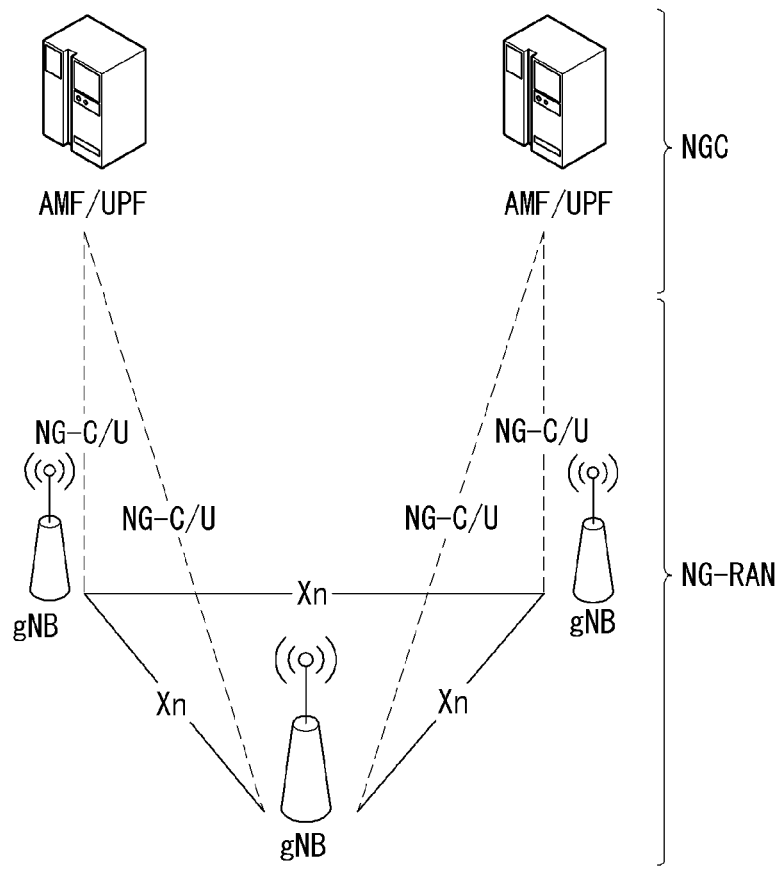
[FIG. 2]
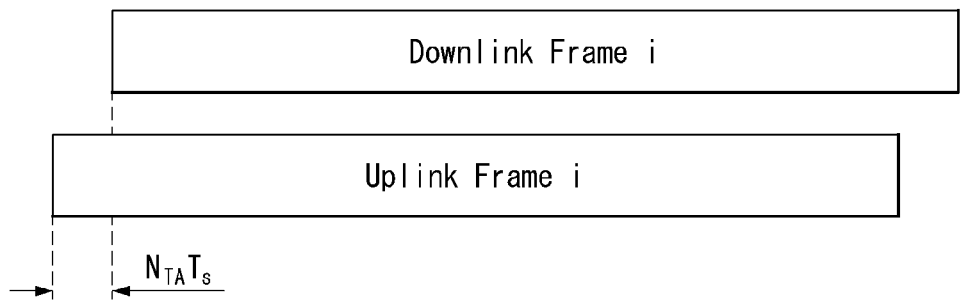

[FIG. 3]
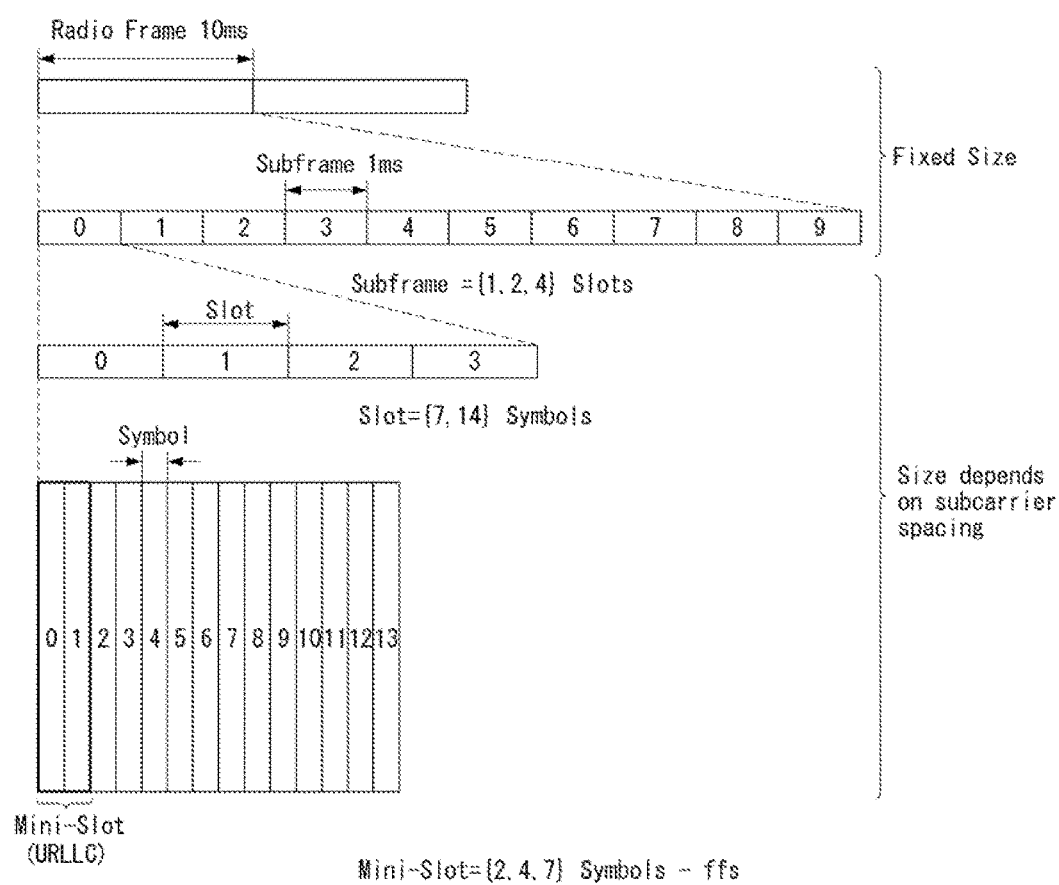

[FIG. 4]
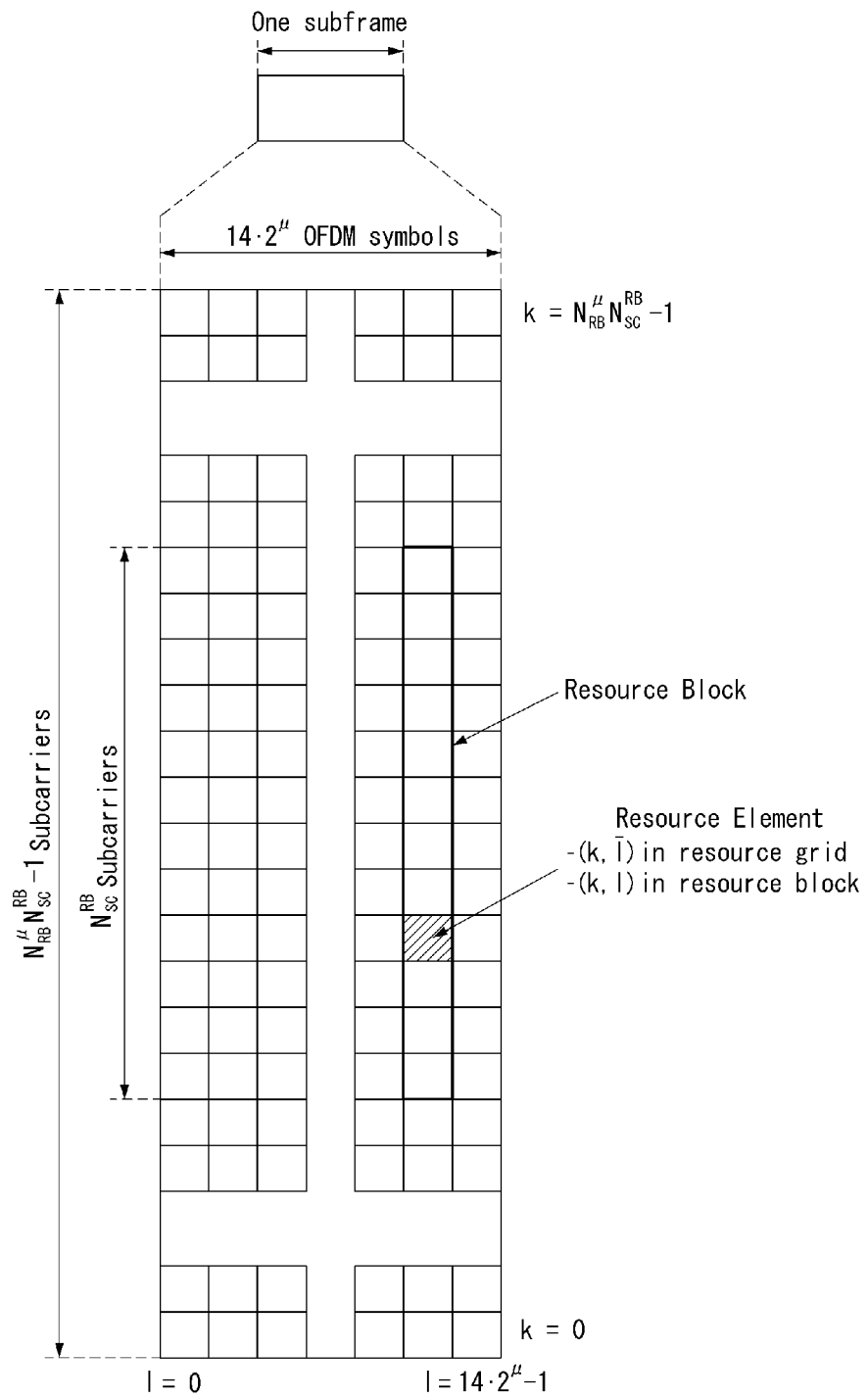

[FIG. 5]
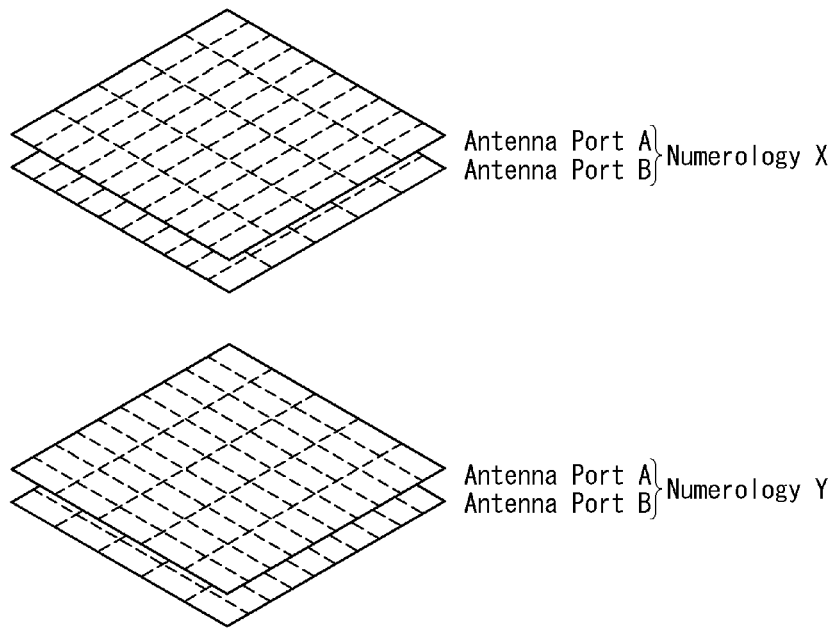
[FIG. 6]
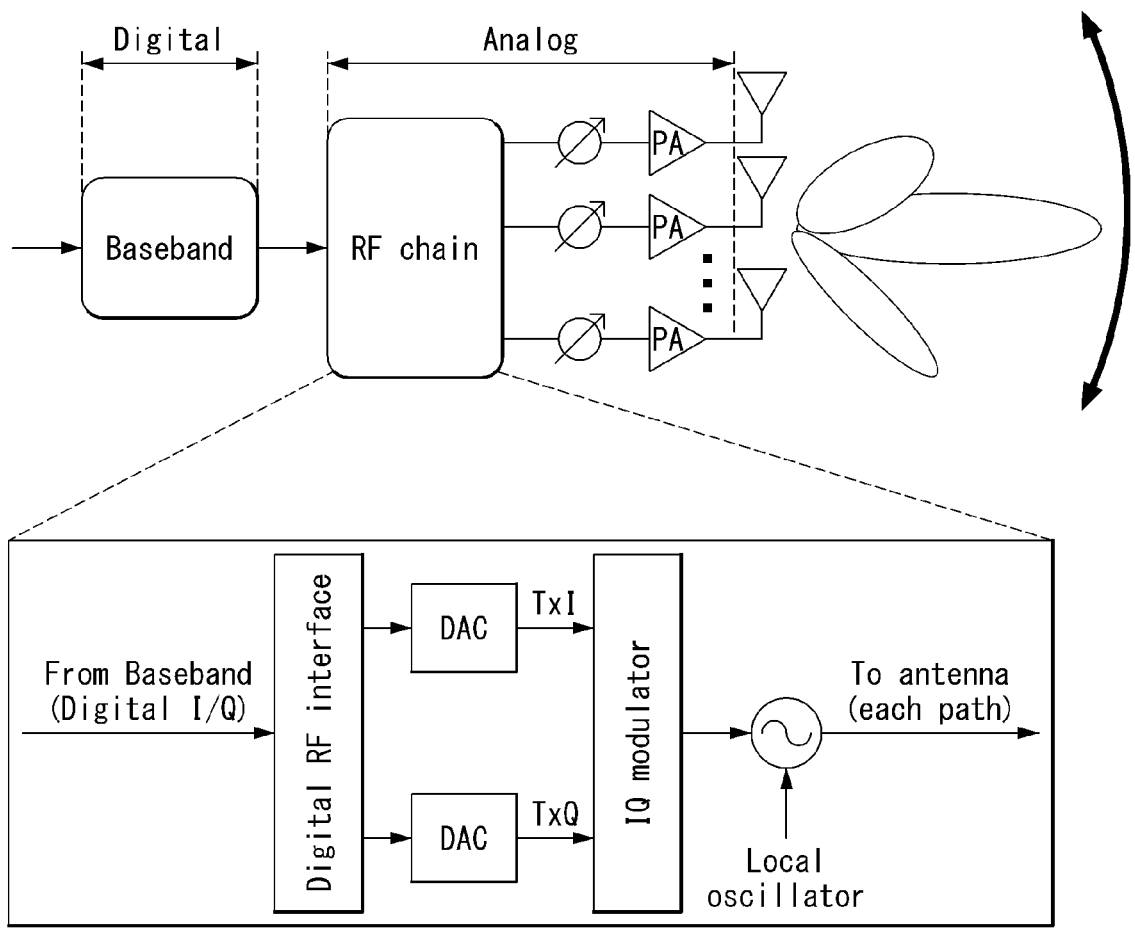

[FIG. 7]
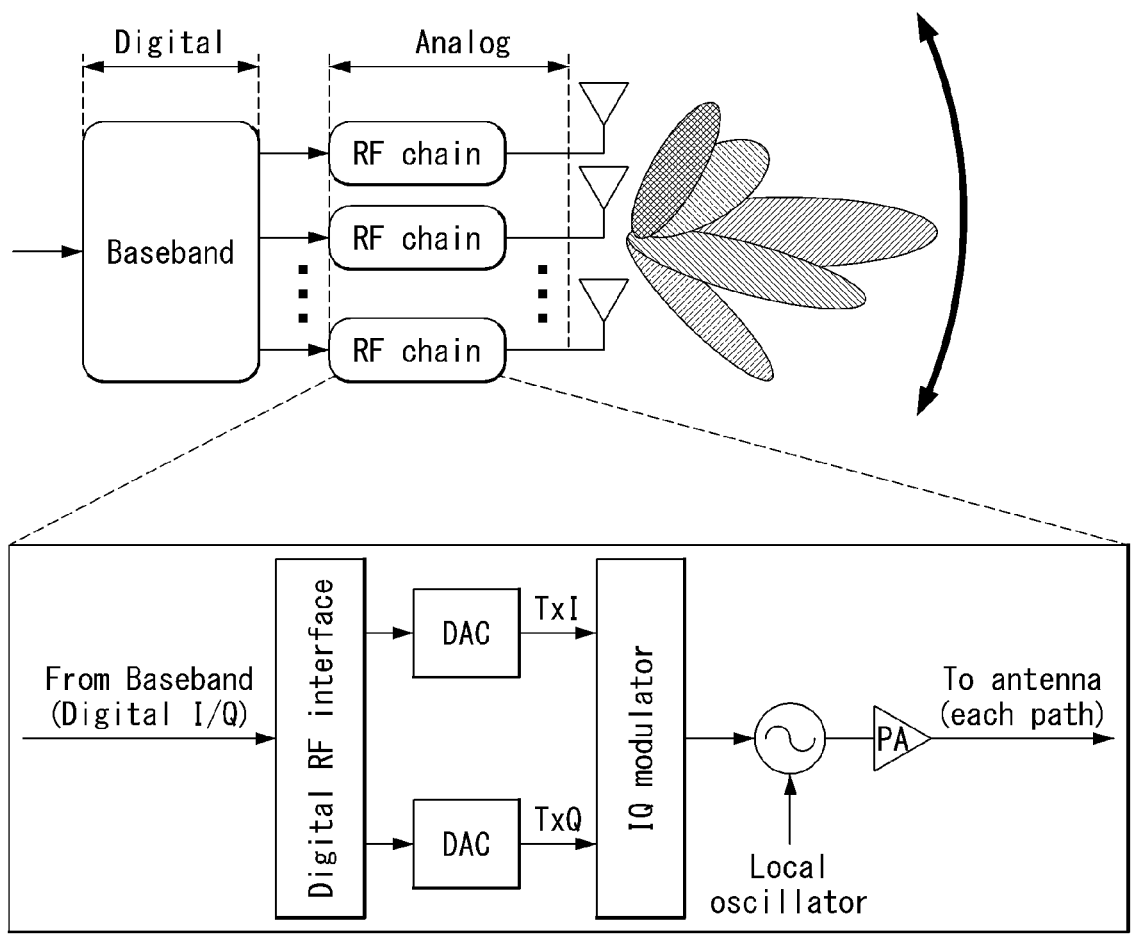

[FIG. 8]
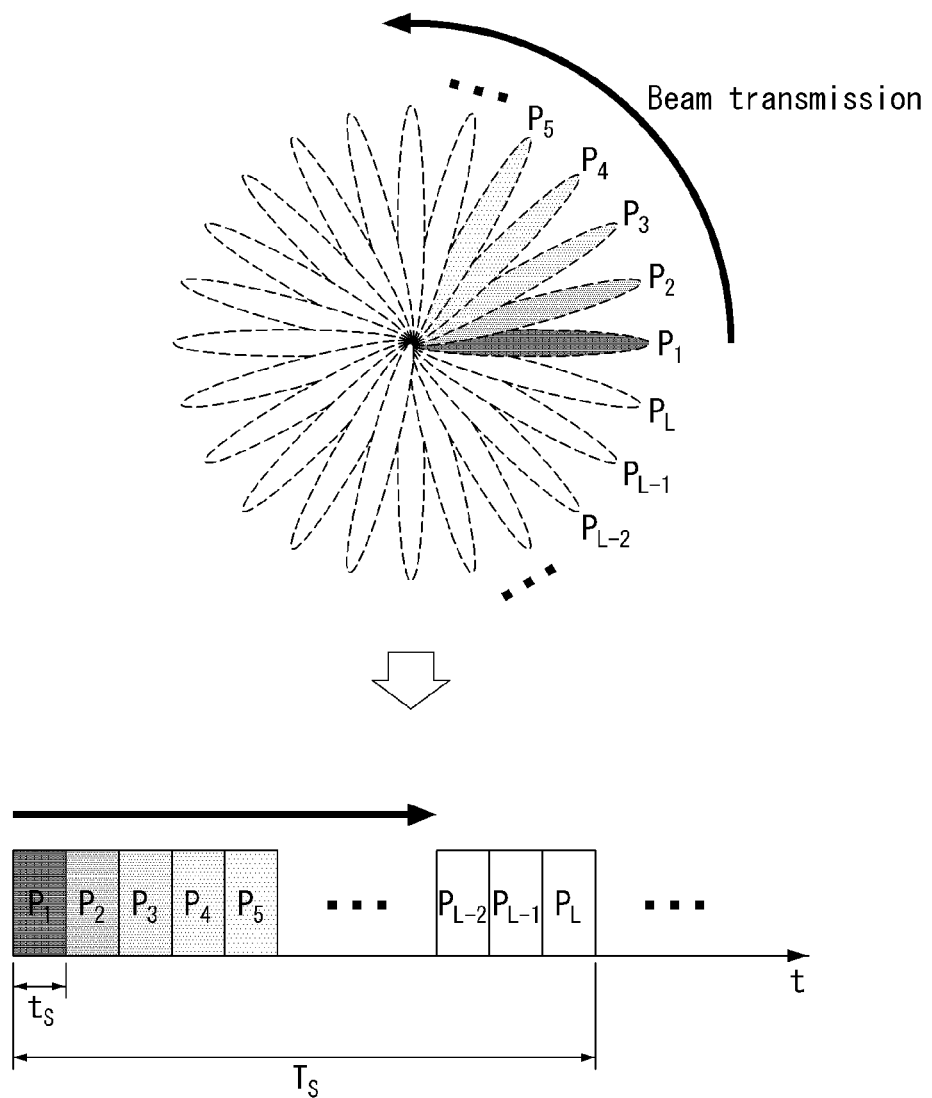

[FIG. 9]
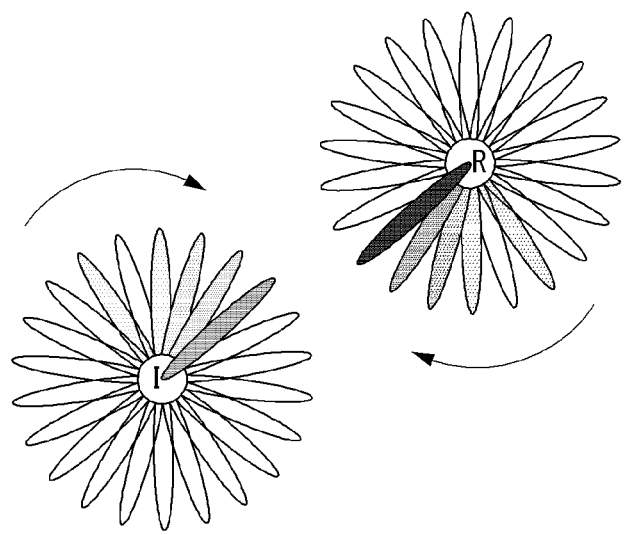
(a)
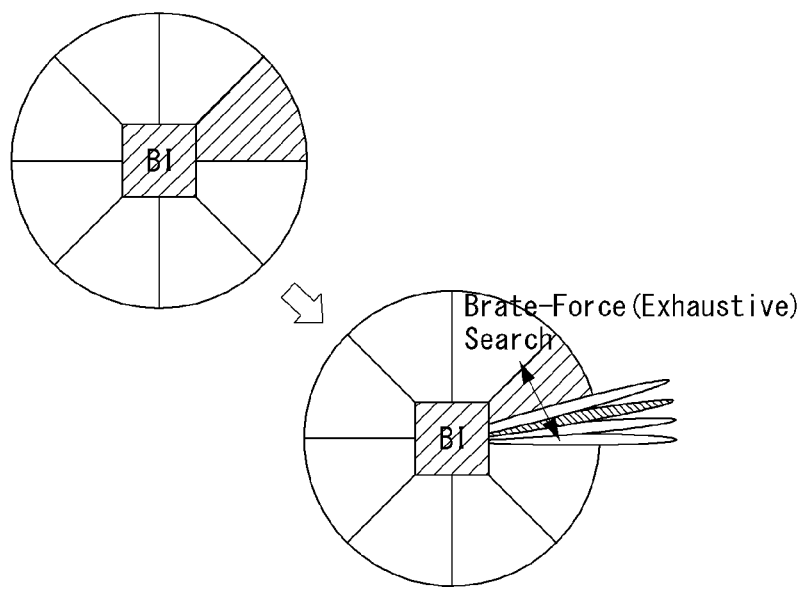
(b)

[FIG. 10]
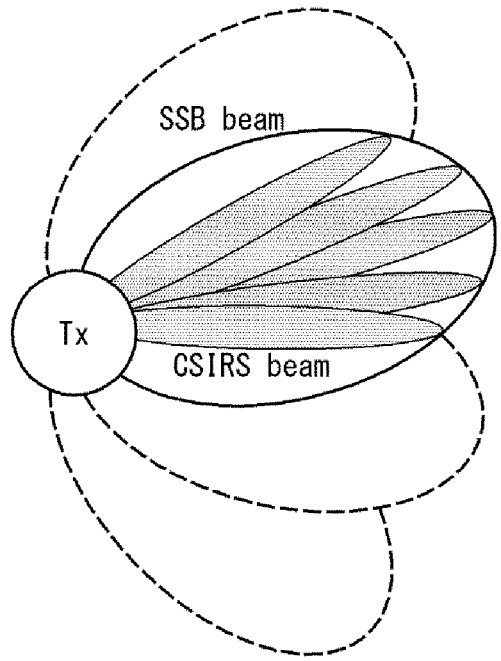
[FIG. 11]
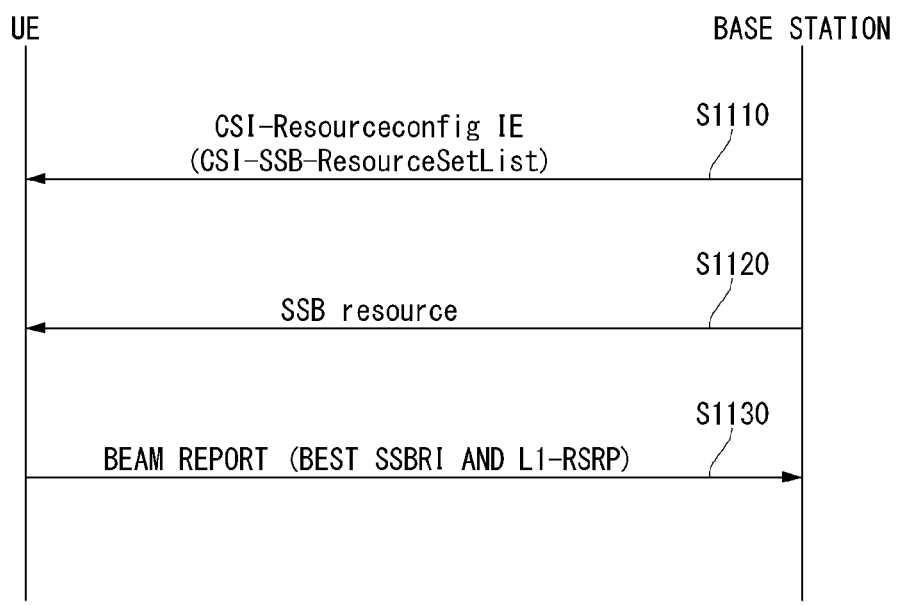

[FIG. 12]
(a)
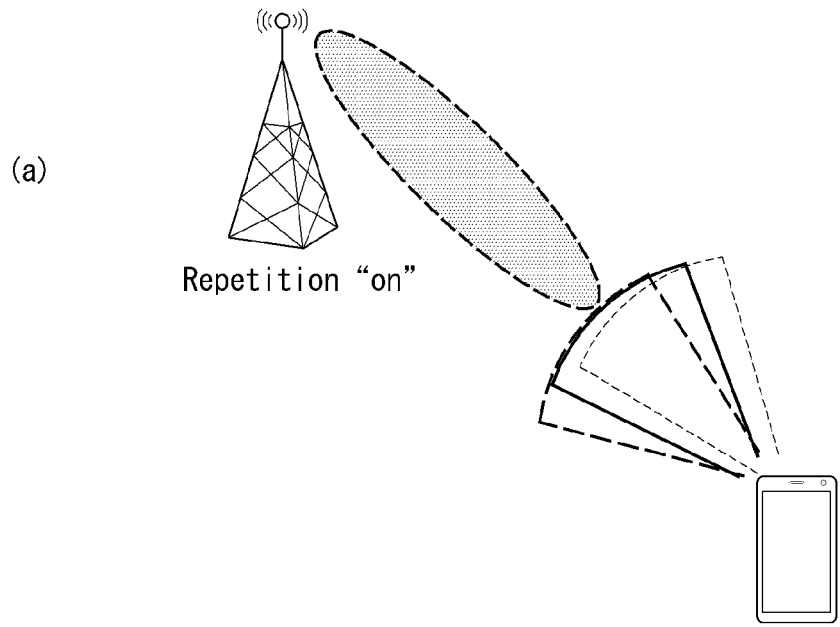
Repetition "on"
(b)
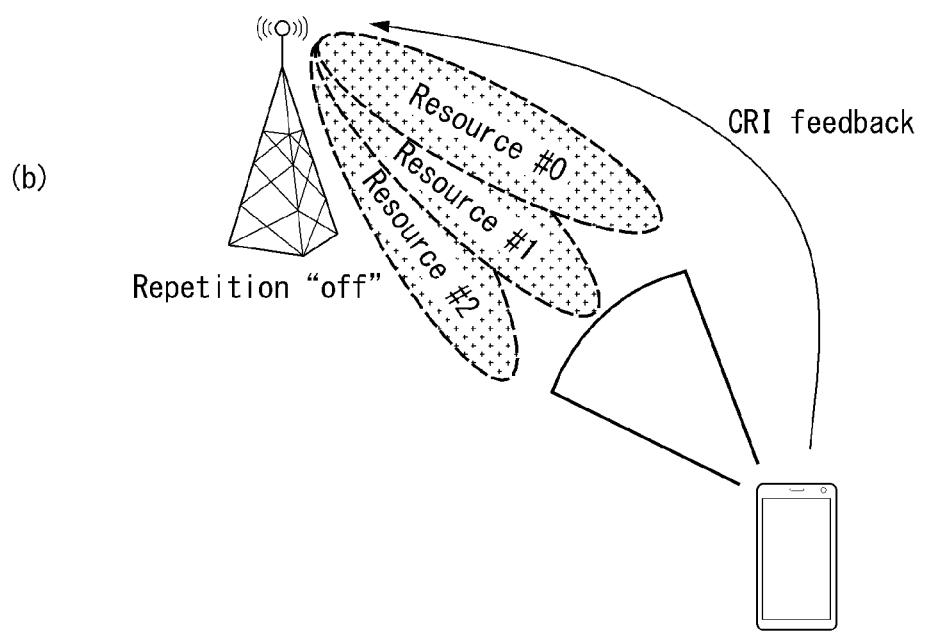
Repetition "off"

[FIG. 13]
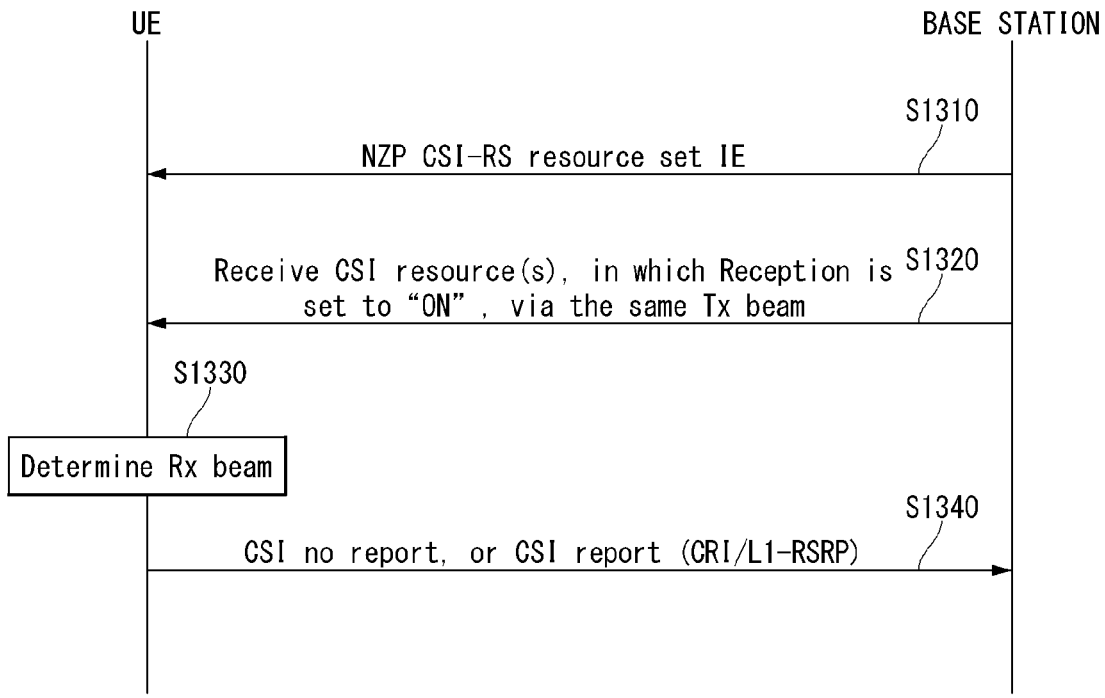
[FIG. 14]
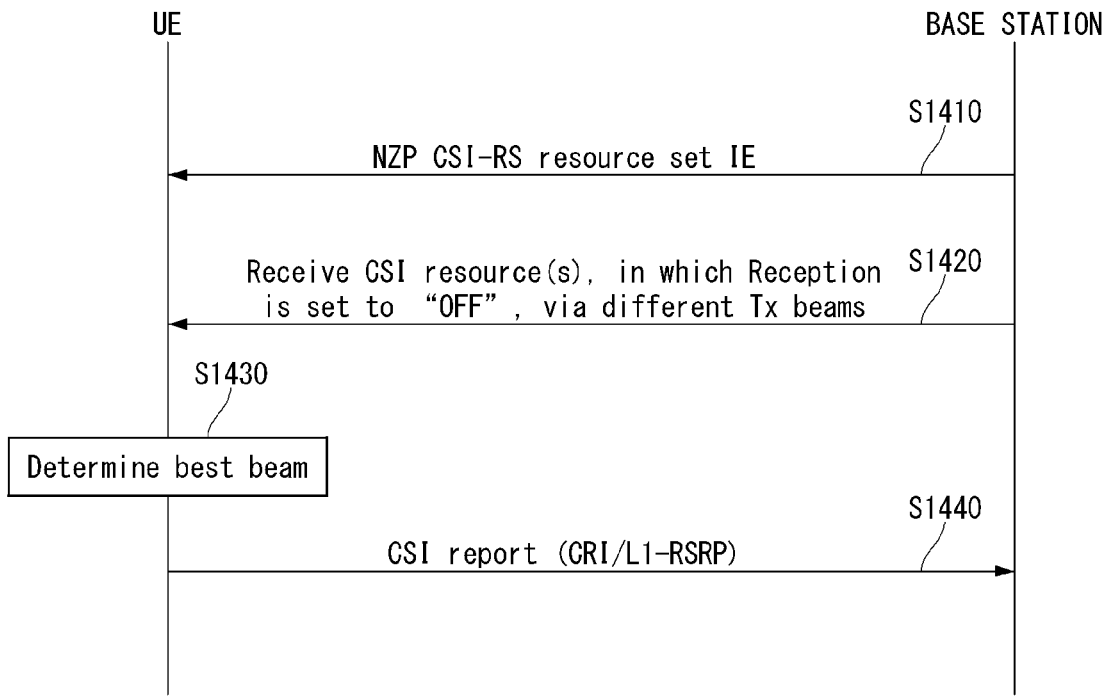

[FIG. 15]
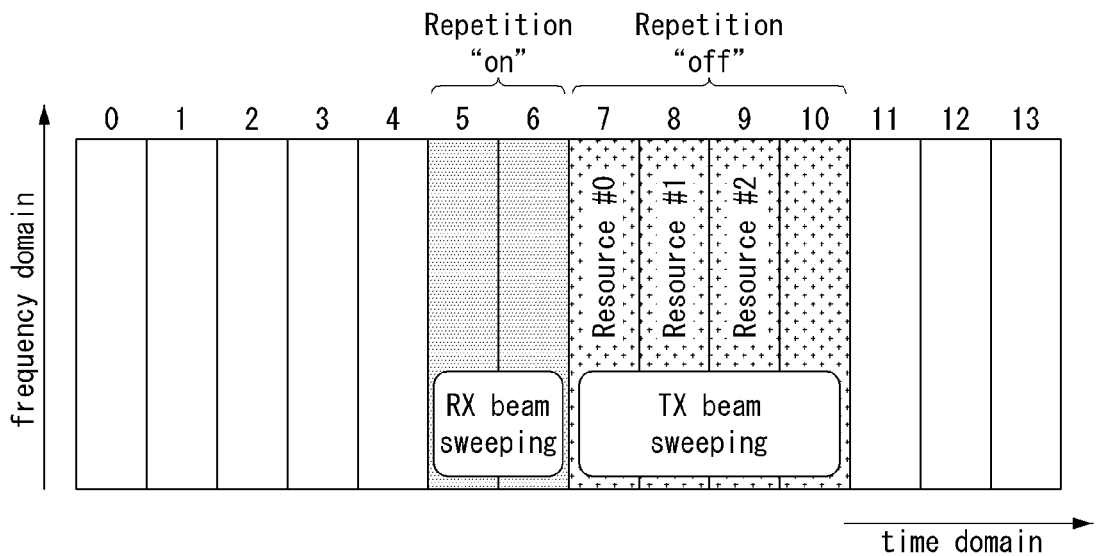
[FIG. 16]
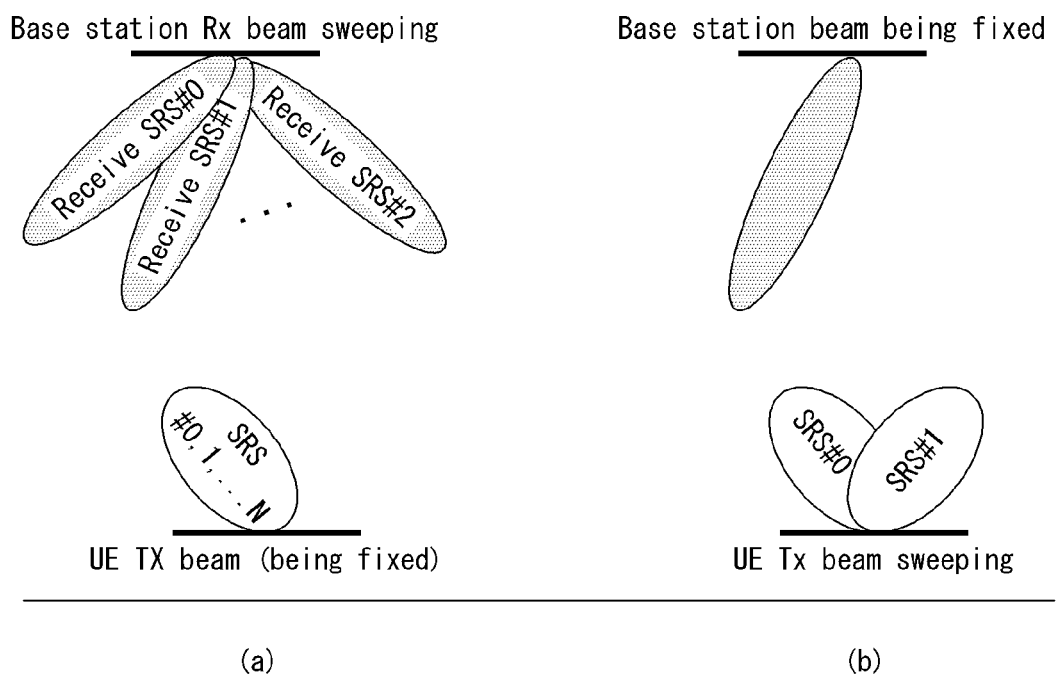
(a)          (b)

[FIG. 17]
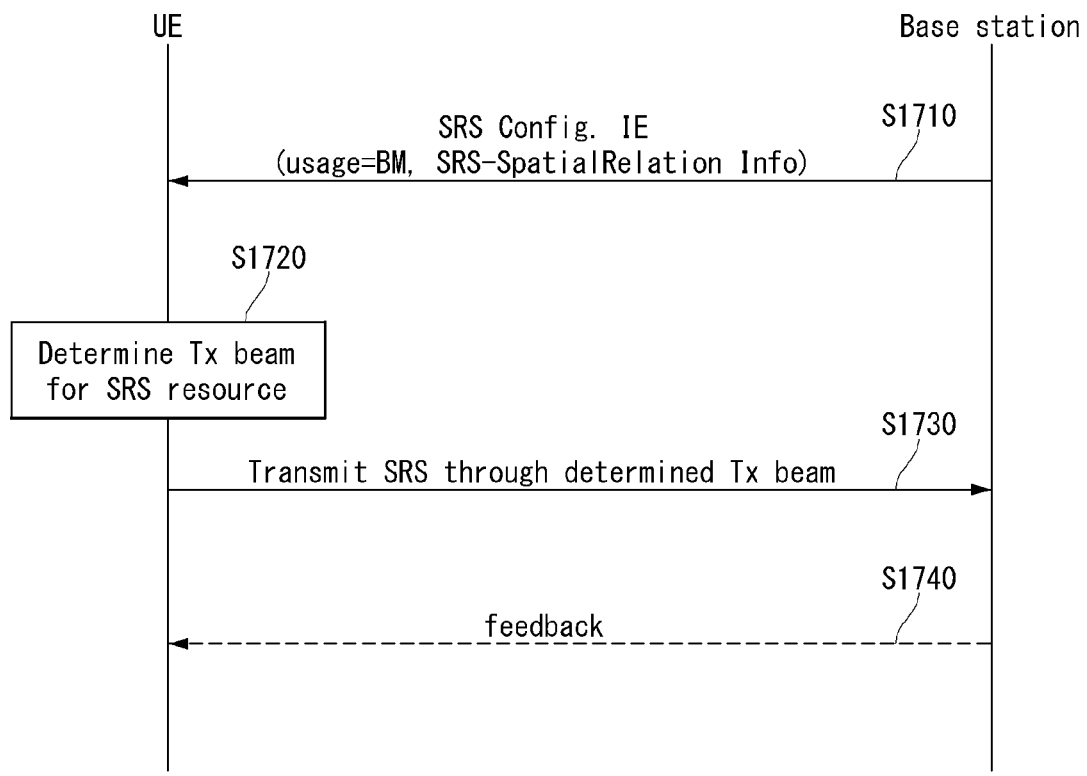
[FIG. 18]
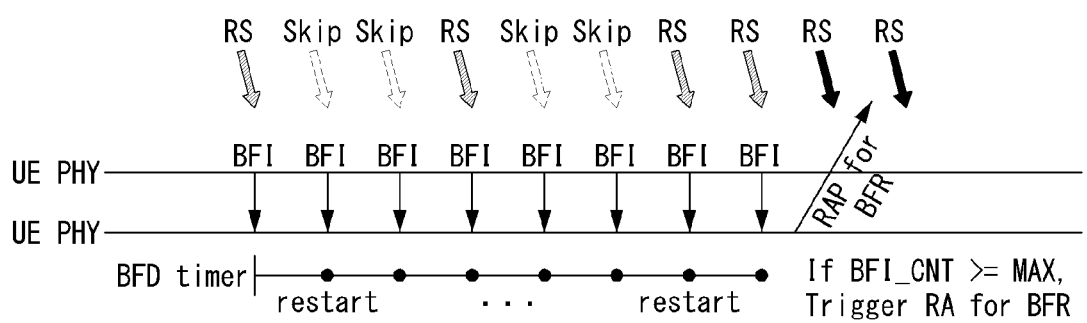

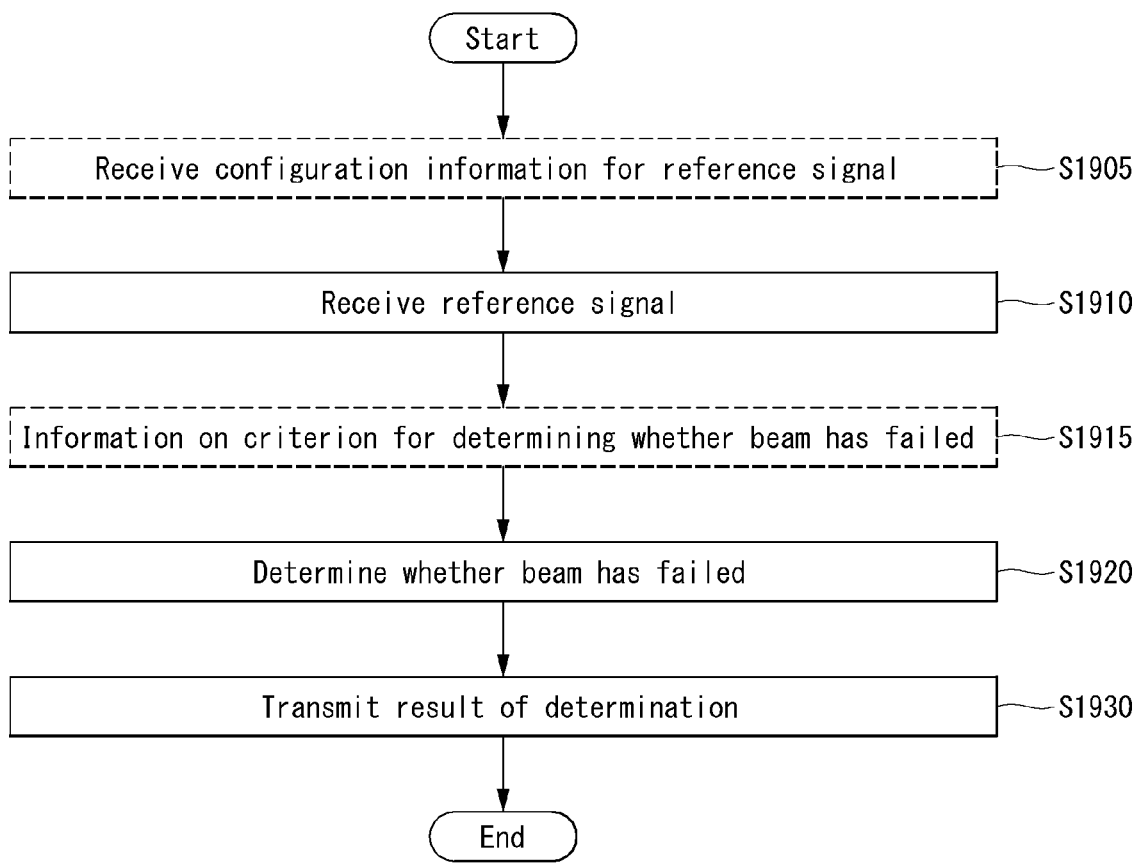

[FIG. 20]
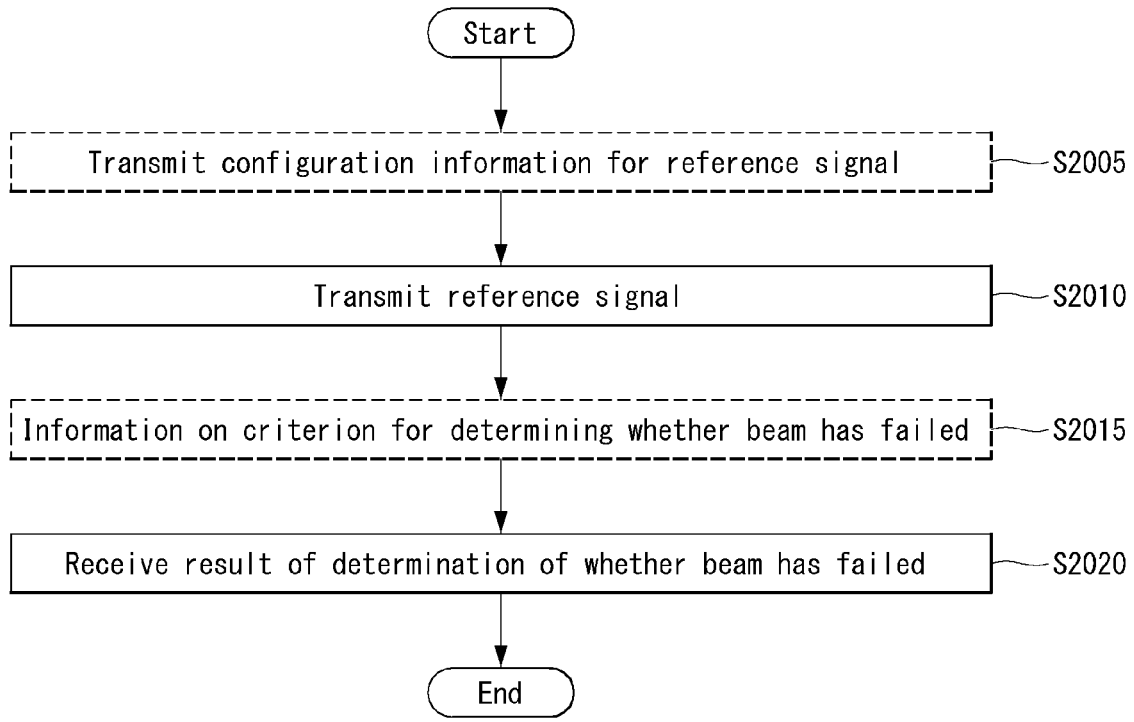
[FIG. 21]
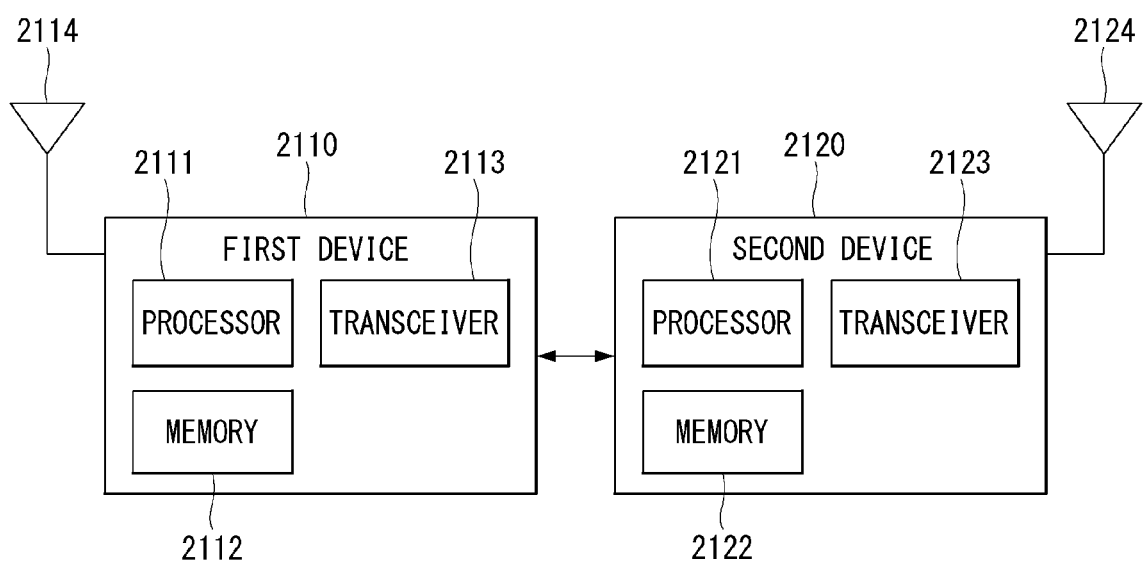

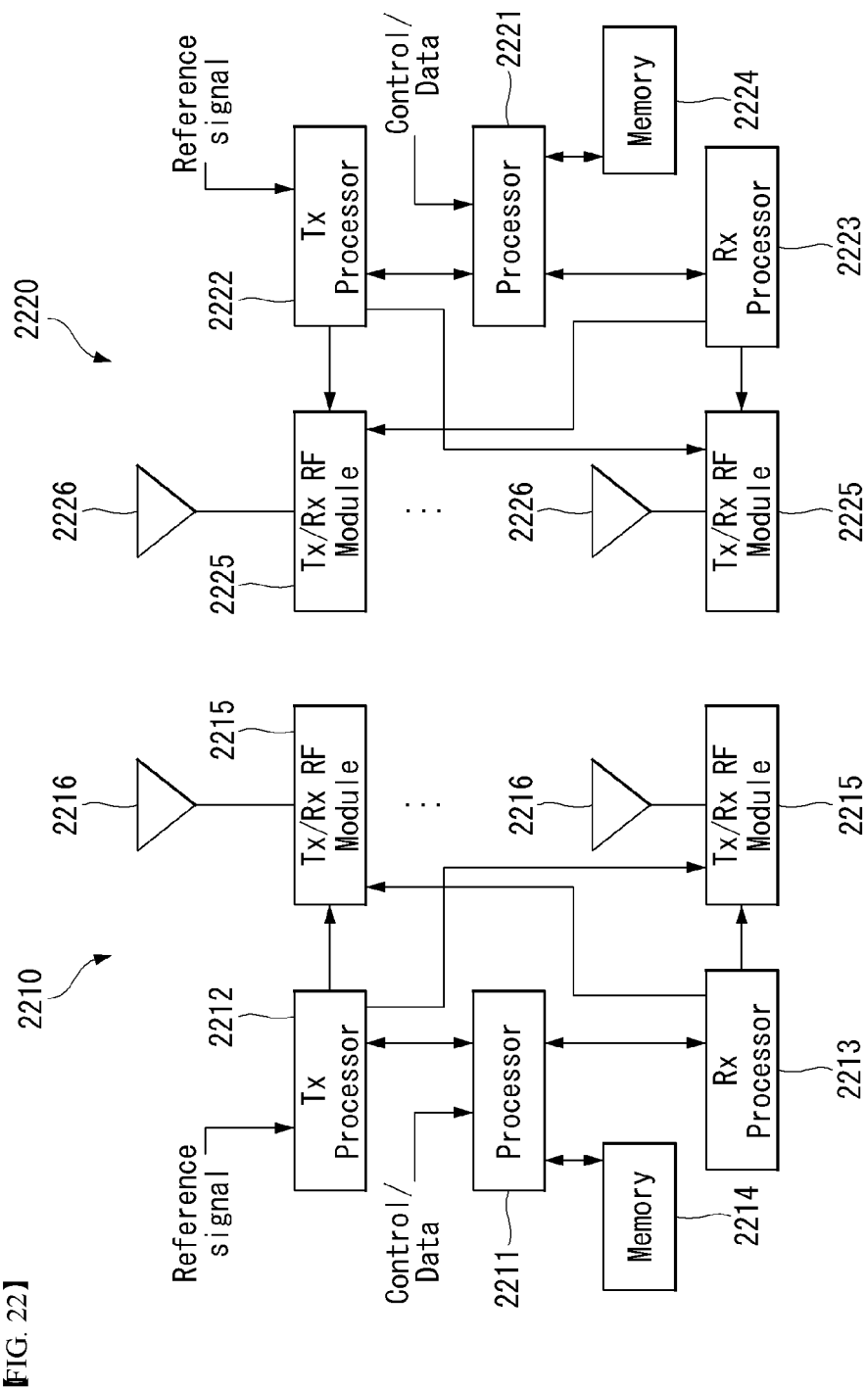
[FIG. 22]

[FIG. 23]
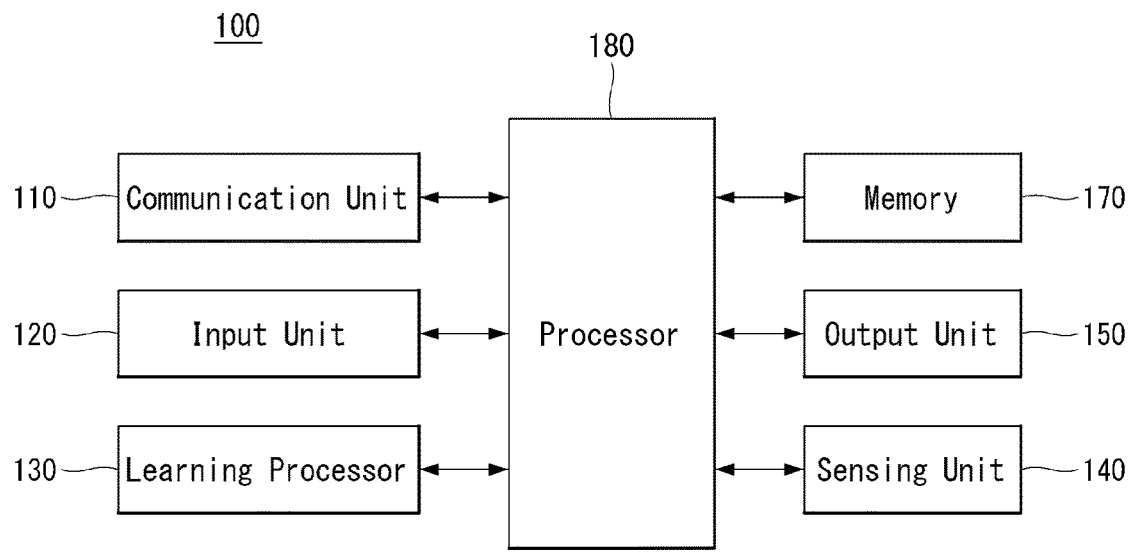
[FIG. 24]
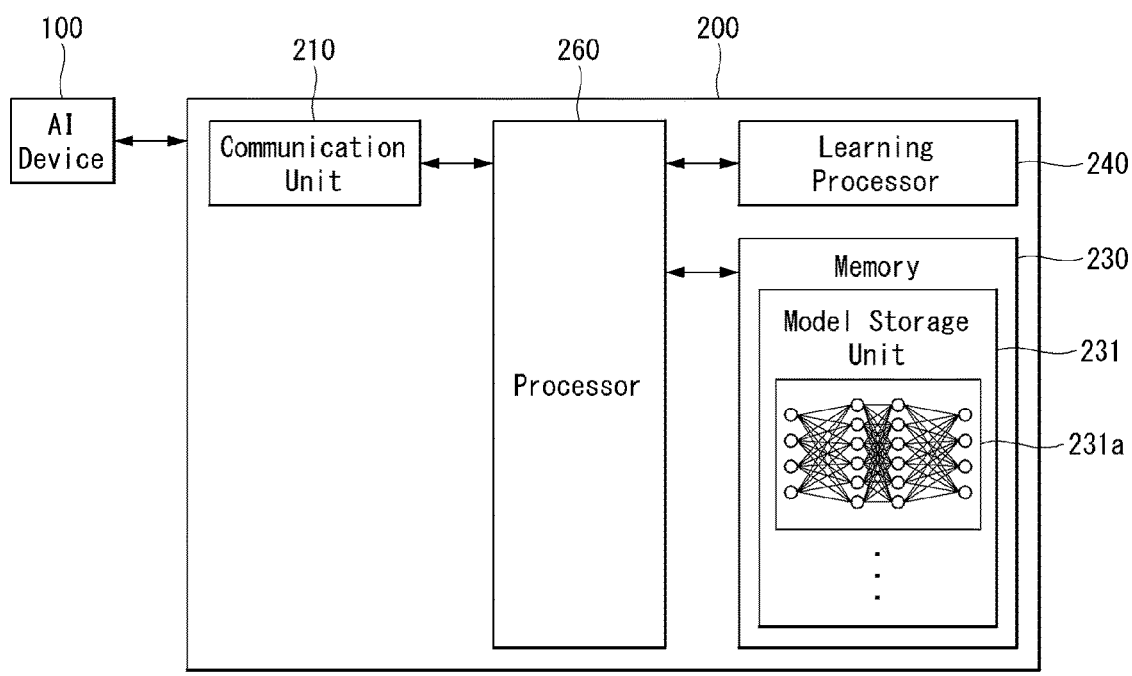

[FIG. 25]
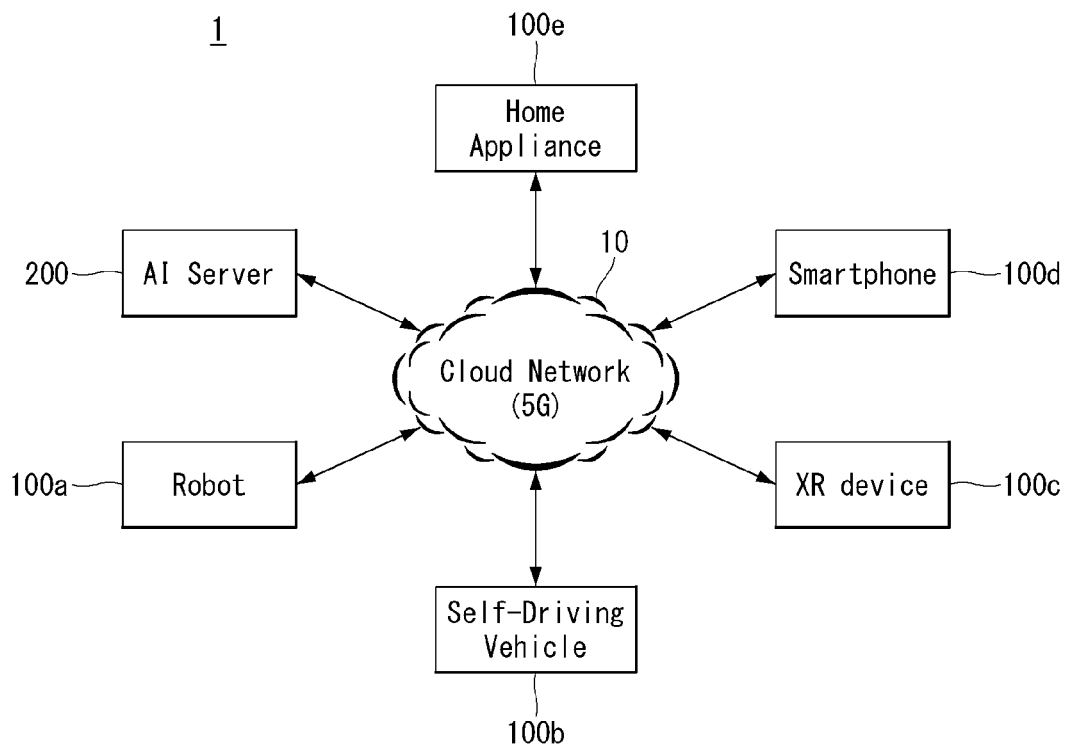

METHOD FOR PERFORMING BEAM FAILURE DETECTION IN WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2019/010076, filed on Aug. 9, 2019, which claims the benefit of U.S. Provisional Application No. 62/716,937, filed on Aug. 9, 2018, the contents of which are all hereby incorporated by reference herein in their entirety.

TECHNICAL FIELD

The present disclosure relates to a wireless communication system and, more particularly, to a method of performing beam failure detection in an unlicensed band and an apparatus supporting the same.

BACKGROUND ART

A mobile communication system has been developed to provide a voice service while ensuring the activity of a user. However, the area of the mobile communication system has extended to a data service in addition to a voice. Due to the current explosive increase in traffic, there is a shortage of resources, and thus users demand a higher speed service. Accordingly, there is a need for a more advanced mobile communication system.

Requirements for a next-generation mobile communication system need to be able to support the accommodation of explosive data traffic, a dramatic increase in the data rate per user, the accommodation of a significant increase in the number of connected devices, very low end-to-end latency, and high-energy efficiency. To this end, various technologies, such as dual connectivity, massive multiple input multiple output (MIMO), in-band full duplex, non-orthogonal multiple access (NOMA), super wideband support, and device networking, are researched.

DISCLOSURE

Technical Problem

The present disclosure proposes a method of performing beam failure detection in a wireless communication system.

Specifically, the present disclosure proposes a method of detecting a beam failure by checking whether a reference signal for beam management is present in an unlicensed band and the state in which quality of the reference signal has been reduced.

Furthermore, the present disclosure proposes a method of preventing an operation of finding out a new beam by preventing a case where a reference signal for beam management is not transmitted in an unlicensed band from being recognized as a beam failure.

Technical problems to be solved by the present disclosure are not limited by the above-mentioned technical problems, and other technical problems which are not mentioned above can be clearly understood from the following description by those skilled in the art to which the present disclosure pertains.

Technical Solution

A method of performing, by a user equipment (UE), beam failure detection in a wireless communication system according to an embodiment of the present disclosure includes receiving a reference signal (RS) from a base station, determining whether a beam has failed by performing measurement on the reference signal, and transmitting, to the base station, a result of the determination of whether the beam has failed, wherein determining whether a beam has failed may include dividing into i) a case where the base station does not transmit a reference signal and ii) a case where quality of a reference signal transmitted by the base station does not satisfy a specific threshold range, and determining that the beam has failed only in the case ii).

Furthermore, in the method according to an embodiment of the present disclosure, the reference signal may be a reference signal triggered by downlink control information (DCI).

Furthermore, in the method according to an embodiment of the present disclosure, the reference signal triggered by the DCI may correspond to an aperiodic channel state information-RS (CSI-RS).

Furthermore, in the method according to an embodiment of the present disclosure, the result of the determination may be aperiodically transmitted from a physical layer to a higher layer.

Furthermore, in the method according to an embodiment of the present disclosure, the result of the determination may be transmitted based on one timing of i) a slot in which the DCI is received, ii) a slot in which the reference signal triggered by the DCI is transmitted or iii) a slot in which a PUSCH or PUCCH assigned for the report is transmitted.

Furthermore, in the method according to an embodiment of the present disclosure, whether the beam has failed may be determined based on one of reference signal received power (RSRP) or a block error rate (BLER) calculated by performing the measurement on the reference signal.

Furthermore, in the method according to an embodiment of the present disclosure, when the RSRP is equal to or lower than a specific threshold, the case i) where the base station does not transmit the reference signal may be determined.

Furthermore, in the method according to an embodiment of the present disclosure, when determining whether the beam has failed based on the BLER, a first threshold for determining the case i) where the base station does not transmit the reference signal and a second threshold for determining the ii) the quality of the reference signal transmitted by the base station may be separately set.

Furthermore, in the method according to an embodiment of the present disclosure, when the BLER is smaller than the first threshold and greater than the second threshold, the beam failure may be determined.

Furthermore, in the method according to an embodiment of the present disclosure, when the BLER is greater than the first threshold, the case i) where the base station does not transmit the reference signal may be determined.

Furthermore, the method according to an embodiment of the present disclosure may further include receiving, from the base station, information on a determination criterion for determining whether a beam has failed.

Furthermore, in the method according to an embodiment of the present disclosure, the information on the determination criterion for determining whether a beam has failed may be configured in any one unit of a band, a component carrier (CC) or a bandwidth part (BWP).

Furthermore, the method according to an embodiment of the present disclosure may further include receiving, from the base station, a reference signal to be used to determine whether a beam has failed among multiple downlink reference signals and/or configuration information for a determination method.

Furthermore, in the method according to an embodiment of the present disclosure, the beam failure detection may be performed in an unlicensed band.

A user equipment (UE) performing beam failure detection in a wireless communication system according to an embodiment of the present disclosure includes a transceiver for transmitting and receiving radio signals and a processor functionally connected to the transceiver. The processor is configured to control the transceiver to receive a reference signal (RS) from a base station, to determine whether a beam has failed by performing measurement on the reference signal, and to control the transceiver to transmit, to the base station, a result of the determination of whether the beam has failed. Determining whether a beam has failed may includes dividing into i) a case where the base station does not transmit a reference signal and ii) a case where quality of a reference signal transmitted by the base station does not satisfy a specific threshold range, and determining that the beam has failed only in the case ii).

Advantageous Effects

According to an embodiment of the present disclosure, an unnecessary BFI indication may not be transmitted by preventing a case where a reference signal is not transmitted from being recognized as a beam failure.

Furthermore, according to an embodiment of the present disclosure, a beam change may be performed only when a beam failure occurs, by distinguishing a case in which a reference signal is not transmitted and a case in which a beam failure actually occurs due to degraded quality of the reference signal.

Furthermore, according to an embodiment of the present disclosure, there is an effect in that a power consumption problem can be solved by preventing an unnecessary beam change operation.

Effects which may be obtained from the disclosure are not limited by the above effects, and other effects that have not been mentioned may be clearly understood from the following description by those skilled in the art to which the disclosure pertains.

DESCRIPTION OF DRAWINGS

The accompanying drawings, which are included to provide a further understanding of the disclosure and constitute a part of the detailed description, illustrate embodiments of the disclosure and together with the description serve to explain the principle of the disclosure.

FIG. 1 is a diagram illustrating an example of an overall system structure of NR to which a method proposed in the present disclosure may be applied.

FIG. 2 illustrates a relationship between an uplink frame and a downlink frame in a wireless communication system to which a method proposed in the present disclosure may be applied.

FIG. 3 illustrates an example of a frame structure in an NR system.

FIG. 4 illustrates an example of a resource grid supported by a wireless communication system to which a method proposed in the present disclosure may be applied.

FIG. 5 illustrates examples of a resource grid for each antenna port and numerology to which a method proposed in the present disclosure may be applied.

FIG. 6 shows an example of a block diagram of a transmitter configured with an analog beamformer and RF chains.

FIG. 7 shows an example of a block diagram of a transmitter configured with a digital beamformer and RF chains.

FIG. 8 illustrates an example of an analog beam scanning method.

FIG. 9 is a diagram that compares beam scanning application methods.

FIG. 10 illustrates an example of beamforming using an SSB and a CSI-RS.

FIG. 11 is a flowchart illustrating an example of a DL BM procedure using an SSB.

FIG. 12 is a diagram illustrating an example of a DL BM procedure using a CSI-RS.

FIG. 13 is a diagram for describing a procedure of determining a reception beam in a downlink beam management procedure using a CSI-RS.

FIG. 14 is a flowchart illustrating an example of a transmission beam determination procedure of a base station.

FIG. 15 is a diagram illustrating an example of resource allocation in time and frequency domains related to the operation of FIG. 12.

FIG. 16 illustrates an example of a UL BM procedure using an SRS.

FIG. 17 is a flowchart illustrating an example of a UL BM procedure using an SRS.

FIG. 18 is an example of a beam failure detection (BFD) procedure of a conventional method in NR-U.

FIG. 19 illustrates an example of an operational flowchart of a UE that performs beam failure detection to which a method proposed in the present disclosure may be applied.

FIG. 20 illustrates an example of an operational flowchart of a base station that performs beam failure detection to which a method proposed in the present disclosure may be applied.

FIG. 21 illustrates a block diagram of a wireless communication apparatus to which methods proposed in the present disclosure may be applied.

FIG. 22 is another example of a block diagram of a wireless communication apparatus to which methods proposed in the present disclosure may be applied.

FIG. 23 illustrates an AI device 100 according to an embodiment of the present disclosure.

FIG. 24 illustrates an AI server 200 according to an embodiment of the present disclosure.

FIG. 25 illustrates an AI system 1 according to an embodiment of the present disclosure.

MODE FOR INVENTION

A detailed description to be disclosed below together with the accompanying drawing is to describe exemplary embodiments of the present disclosure and not to describe a unique embodiment for carrying out the present disclosure. The detailed description below includes details to provide a complete understanding of the present disclosure. However, those skilled in the art know that the present disclosure may be carried out without the details.

In some cases, in order to prevent a concept of the present disclosure from being ambiguous, known structures and devices may be omitted or illustrated in a block diagram format based on core functions of each structure and device.

Hereinafter, downlink (DL) means communication from the base station to the terminal and uplink (UL) means communication from the terminal to the base station. In downlink, a transmitter may be part of the base station, and a receiver may be part of the terminal. In uplink, the transmitter may be part of the terminal and the receiver may be part of the terminal. The base station may be expressed as a first communication device and the terminal may be expressed as a second communication device. A base station (BS) may be replaced with terms including a fixed station, a Node B, an evolved-NodeB (eNB), a Next Generation NodeB (gNB), a base transceiver system (BTS), an access point (AP), a network (5G network), an AI system, a road side unit (RSU), a vehicle, a robot, an Unmanned Aerial Vehicle (UAV), AR (Augmented Reality) device, VR (Virtual Reality) device, and the like. Further, the terminal may be fixed or mobile and may be replaced with terms including a User Equipment (UE), a Mobile Station (MS), a user terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, and a Device-to-Device (D2D) device, the vehicle, the robot, an AI module, an Unmanned Aerial Vehicle (UAV), AR (Augmented Reality) device, VR (Virtual Reality) device, and the like.

The following technology may be used in various radio access system including CDMA, FDMA, TDMA, OFDMA, SC-FDMA, and the like. The CDMA may be implemented as radio technology such as Universal Terrestrial Radio Access (UTRA) or CDMA2000. The TDMA may be implemented as radio technology such as a global system for mobile communications (GSM)/general packet radio service (GPRS)/enhanced data rates for GSM evolution (EDGE). The OFDMA may be implemented as radio technology such as Institute of Electrical and Electronics Engineers (IEEE) 802.11 (Wi-Fi), IEEE 802.16 (WiMAX), IEEE 802.20, Evolved UTRA (E-UTRA), or the like. The UTRA is a part of Universal Mobile Telecommunications System (UMTS). 3rd Generation Partnership Project (3GPP) Long Term Evolution (LTE) is a part of Evolved UMTS (E-UMTS) using the E-UTRA and LTE-Advanced (A)/LTE-A pro is an evolved version of the 3GPP LTE. 3GPP NR (New Radio or New Radio Access Technology) is an evolved version of the 3GPP LTE/LTE-A/LTE-A pro.

For clarity of description, the technical spirit of the present disclosure is described based on the 3GPP communication system (e.g., LTE-A or NR), but the technical spirit of the present disclosure are not limited thereto. LTE means technology after 3GPP TS 36.xxx Release 8. In detail, LTE technology after 3GPP TS 36.xxx Release 10 is referred to as the LTE-A and LTE technology after 3GPP TS 36.xxx Release 13 is referred to as the LTE-A pro. The 3GPP NR means technology after TS 38.xxx Release 15. The LTE/NR may be referred to as a 3GPP system. "xxx" means a standard document detail number. Matters disclosed in a standard document opened before the present disclosure may be referred to for a background art, terms, abbreviations, etc., used for describing the present disclosure. For example, the following documents may be referred to.

3GPP LTE
36.211: Physical channels and modulation
36.212: Multiplexing and channel coding
36.213: Physical layer procedures
36.300: Overall description
36.331: Radio Resource Control (RRC)
3GPP NR
38.211: Physical channels and modulation
38.212: Multiplexing and channel coding
38.213: Physical layer procedures for control
38.214: Physical layer procedures for data
38.300: NR and NG-RAN Overall Description
36.331: Radio Resource Control (RRC) protocol specification As more and more communication devices require larger communication capacity, there is a need for improved mobile broadband communication compared to the existing radio access technology (RAT). Further, massive machine type communications (MTCs), which provide various services anytime and anywhere by connecting many devices and objects, are one of the major issues to be considered in the next generation communication. In addition, a communication system design considering a service/UE sensitive to reliability and latency is being discussed. The introduction of next generation radio access technology considering enhanced mobile broadband communication (eMBB), massive MTC (mMTC), ultra-reliable and low latency communication (URLLC) is discussed, and in the present disclosure, the technology is called new RAT for convenience. The NR is an expression representing an example of 5G radio access technology (RAT).

Three major requirement areas of 5G include (1) an enhanced mobile broadband (eMBB) area, (2) a massive machine type communication (mMTC) area and (3) an ultra-reliable and low latency communications (URLLC) area.

Some use cases may require multiple areas for optimization, and other use case may be focused on only one key performance indicator (KPI). 5G support such various use cases in a flexible and reliable manner.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billion.

The industry IoT is one of areas in which 5G performs major roles enabling smart city, asset tracking, smart utility, agriculture and security infra.

URLLC includes a new service which will change the industry through remote control of major infra and a link having ultra reliability/low available latency, such as a self-driving vehicle. A level of reliability and latency is essential for smart grid control, industry automation, robot engineering, drone control and adjustment.

Multiple use cases are described more specifically.

5G may supplement fiber-to-the-home (FTTH) and cable-based broadband (or DOCSIS) as means for providing a stream evaluated from gigabits per second to several hundreds of mega bits per second. Such fast speed is necessary to deliver TV with resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

An automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between an automotive and other connected devices (e.g., devices accompanied by a pedestrian). A safety system guides alternative courses of a behavior so that a driver can drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system can support remote treatment providing clinical treatment at a distant place. This helps to reduce a barrier for the distance and can improve access to medical services which are not continuously used at remote farming areas. Furthermore, this is used to save life in important treatment and an emergency condition. A radio sensor network based on mobile communication can provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive opportunity in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

In a new RAT system including NR uses an OFDM transmission scheme or a similar transmission scheme thereto. The new RAT system may follow OFDM parameters different from OFDM parameters of LTE. Alternatively, the new RAT system may follow numerology of conventional LTE/LTE-A as it is or have a larger system bandwidth (e.g., 100 MHz). Alternatively, one cell may support a plurality of numerologies. In other words, UEs that operate with different numerologies may coexist in one cell.

The numerology corresponds to one subcarrier spacing in a frequency domain.

Different numerologies may be defined by scaling reference subcarrier spacing to an integer N.

Definition of Terms eLTE eNB: The eLTE eNB is the evolution of eNB that supports connectivity to EPC and NGC.

gNB: A node which supports the NR as well as connectivity to NGC.

New RAN: A radio access network which supports either NR or E-UTRA or interfaces with the NGC.

Network slice: A network slice is a network created by the operator customized to provide an optimized solution for a specific market scenario which demands specific requirements with end-to-end scope.

Network function: A network function is a logical node within a network infrastructure that has well-defined external interfaces and well-defined functional behavior.

NG-C: A control plane interface used on NG2 reference points between new RAN and NGC.

NG-U: A user plane interface used on NG3 references points between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: A termination point of NG-U interface.

Overview of System

FIG. 1 illustrates an example of an overall structure of an NR system to which a method proposed in the present disclosure is applicable.

Referring to FIG. 1, an NG-RAN is configured with an NG-RA user plane (new AS sublayer/PDCP/RLC/MAC/PHY) and gNBs which provide a control plane (RRC) protocol end for a user equipment (UE).

The gNBs are interconnected through an Xn interface.

The gNBs are also connected to an NGC through an NG interface.

More specifically the gNBs are connected to an access and mobility management function (AMF) through an N2 interface and to a user plane function (UPF) through an N3 interface.

NR (New Rat) Numerology and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or μ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an orthogonal frequency division multiplexing (OFDM) numerology and a frame structure, which may be considered in the NR system, will be described.

A plurality of OFDM numerologies supported in the NR system may be defined as in Table 1.

TABLE 1

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

Regarding a frame structure in the NR system, a size of various fields in the time domain is expressed as a multiple of a time unit of $T_s = (\Delta f_{max} \cdot N_f)$. In this case, $\Delta f_{max} = 480 \cdot 10^3$, and $N_f = 4096$, DL and UL transmission is configured as a radio frame having a section of $T_f = (\Delta f_{max} N_f / 100) \cdot T_s = 10$ ms. The radio frame is composed of ten subframes each having a section of $T_{sf} = (\Delta f_{max} N_f / 1000) \cdot T_s = 1$ ms. In this case, there may be a set of UL frames and a set of DL frames.

FIG. 2 illustrates a relation between an uplink frame and a downlink frame in a wireless communication system to which a method proposed in the present disclosure is applicable.

As illustrated in FIG. 2, uplink frame number i for transmission from a user equipment (UE) shall start $T_{TA} = N_{TA} T_s$ before the start of a corresponding downlink frame at the corresponding UE.

Regarding the numerology μ, slots are numbered in increasing order of $n_s^\mu \in \{0, \ldots, N_{subframe}^{slots, \mu} - 1\}$ within a subframe and are numbered in increasing order of $n_{s,f}^\mu \in \{0, \ldots, N_{frame}^{slots, \mu} - 1\}$ within a radio frame. One slot consists of consecutive OFDM symbols of $N_{symb}^\mu$, and $N_{symb}^\mu$ determined depending on a numerology used and slot configuration. The start of slots $n_s^\mu$ in a subframe is aligned in time with the start of OFDM symbols $n_s^\mu N_{symb}^\mu$ in the same subframe.

Not all UEs are able to transmit and receive at the same time, and this means that not all OFDM symbols in a downlink slot or an uplink slot are available to be used.

Table 2 represents the number $N_{symb}^{slot}$ of OFDM symbols per slot, the number $N_{symb}^{frame, \mu}$ of slots per radio frame, and the number $N_{slot}^{subframe, \mu}$ slot of slots per subframe in a normal CP. Table 3 represents the number of OFDM symbols per slot, the number of slots per radio frame, and the number of slots per subframe in an extended CP.

TABLE 2

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 3

| μ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 3 illustrates an example of a frame structure in a NR system. FIG. 3 is merely for convenience of explanation and does not limit the scope of the present disclosure.

In Table 3, in case of μ=2, i.e., as an example in which a subcarrier spacing (SCS) is 60 kHz, one subframe (or frame) may include four slots with reference to Table 2, and one subframe={1, 2, 4} slots shown in FIG. 3, for example, the number of slot(s) that may be included in one subframe may be defined as in Table 2.

Further, a mini-slot may consist of 2, 4, or 7 symbols, or may consist of more symbols or less symbols.

In relation to physical resources in the NR system, an antenna port, a resource grid, a resource element, a resource block, a carrier part, etc., may be considered.

Hereinafter, the above physical resources that may be considered in the NR system are described in more detail.

First, in relation to an antenna port, the antenna port is defined so that a channel over which a symbol on an antenna port is conveyed may be inferred from a channel over which another symbol on the same antenna port is conveyed. When large-scale properties of a channel over which a symbol on one antenna port is conveyed may be inferred from a channel over which a symbol on another antenna port is conveyed, the two antenna ports may be regarded as being in a quasi co-located or quasi co-location (QC/QCL) relation. In this case, the large-scale properties may include at least one of delay spread, Doppler spread, frequency shift, average received power, and received timing.

FIG. 4 illustrates an example of a resource grid supported in a wireless communication system to which a method proposed in the present disclosure is applicable.

Referring to FIG. 4, a resource grid consists of $N_{RB}^{\mu} N_{sc}^{RB}$ subcarriers on a frequency domain, each subframe consisting of 14·2μ OFDM symbols, but the disclosure is not limited thereto.

In the NR system, a transmitted signal is described by one or more resource grids, consisting of $N_{RB}^{\mu} N_{sc}^{RB}$ subcarriers, and $2^{\mu} N_{symb}^{(\mu)}$ OFDM symbols, where $N_{RB}^{\mu} \leq N_{RB}^{max,\mu}$. $N_{RB}^{max,\mu}$ denotes a maximum transmission bandwidth and may change not only between numerologies but also between uplink and downlink.

In this case, as illustrated in FIG. 5, one resource grid may be configured per numerology μ and antenna port p.

FIG. 5 illustrates examples of a resource grid per antenna port and numerology to which a method proposed in the present disclosure is applicable.

Each element of the resource grid for the numerology μ and the antenna port p is called a resource element and is uniquely identified by an index pair (k,l̄), where k=0, ..., $N_{RB}^{\mu} N_{sc}^{Rb}-1$ is an index on a frequency domain, and l̄=0, ..., $2^{\mu} N_{symb}^{(\mu)}-1$ refers to a location of a symbol in a subframe. The index pair (k,l) is used to refer to a resource element in a slot, where l=0, ..., $N_{symb}^{\mu}-1$.

The resource element (k,l̄) for the numerology μ and the antenna port p corresponds to a complex value $a_{k,\bar{l}}^{(p,\mu)}$. When there is no risk for confusion or when a specific antenna port or numerology is not specified, the indexes p and μ may be dropped, and as a result, the complex value may be $a_{k,\bar{l}}^{(p)}$ or $a_{k,\bar{l}}$.

Further, a physical resource block is defined as $N_{sc}^{RB}=12$ consecutive subcarriers in the frequency domain.

Point A serves as a common reference point of a resource block grid and may be obtained as follows.

offsetToPointA for PCell downlink represents a frequency offset between the point A and a lowest subcarrier of a lowest resource block that overlaps a SS/PBCH block used by the UE for initial cell selection, and is expressed in units of resource blocks assuming 15 kHz subcarrier spacing for FR1 and 60 kHz subcarrier spacing for FR2;
  absoluteFrequencyPointA represents frequency-location of the point A expressed as in absolute radio-frequency channel number (ARFCN).

The common resource blocks are numbered from 0 and upwards in the frequency domain for subcarrier spacing configuration μ.

The center of subcarrier 0 of common resource block 0 for the subcarrier spacing configuration μ coincides with 'point A'. A common resource block number $n_{CRB}^{\mu}$ in the frequency domain and resource elements (k, l) for the subcarrier spacing configuration μ may be given by the following Equation 1.

$$n_{CRB}^{\mu} = \left\lfloor \frac{k}{N_{sc}^{RB}} \right\rfloor \quad \text{[Equation 1]}$$

Here, k may be defined relative to the point A so that k=0 corresponds to a subcarrier centered around the point A. Physical resource blocks are defined within a bandwidth part (BWP) and are numbered from 0 to $N_{BWP,i}^{size}-1$, where i is No. of the BWP. A relation between the physical resource block $n_{PRB}$ in BWP i and the common resource block $n_{CRB}$ may be given by the following Equation 2.

$$n_{CRB} = n_{PRB} + N_{BWP,i}^{start} \quad \text{[Equation 2]}$$

Here, $N_{BWP,i}^{start}$ may be the common resource block where the BWP starts relative to the common resource block 0.

Bandwidth Part (BWP)

An NR system may be supported up to a maximum of 400 MHz per one component carrier (CC). If a terminal operating in such a wideband CC operates with its RF for all CCs being turned on, terminal battery consumption may be increased. Alternatively, if several use cases (e.g., eMBB, URLLC, Mmtc, V2X) operating within one wideband CC are taken into consideration, a different numerology (e.g., sub-carrier spacing) for each frequency band within the corresponding CC may be supported. Alternatively, the capability of a maximum bandwidth may be different for each terminal. A base station may indicate that the terminal operates only in some bandwidth not the full bandwidth of the wideband CC by taking the capacity into consideration. The corresponding some bandwidth is defined as a bandwidth part (BWP), for convenience sake. The BWP may be configured with resource blocks (RBs) contiguous on a frequency axis, and may correspond to one numerology (e.g., sub-carrier spacing, CP length, slot/mini-slot duration).

Meanwhile, a base station may configure multiple BWPs within one CC configure in a terminal. For example, in a PDCCH monitoring slot, a BWP occupying a relatively small frequency domain may be configured, and a PDSCH indicated in a PDCCH may be scheduled on a BWP greater than the configured BWP. Alternatively, if UEs are crowded in a specific BWP, some UEs may be configured in other BWP for load balancing. Alternatively, some spectrum at the center of a full bandwidth may be excluded by taking into consideration frequency domain inter-cell interference cancellation between neighbor cells, and BWPs on both sides may be configured in the same slot.

That is, the base station may configure at least one DL/UL BWP in a terminal associated with a wideband CC, may activate at least one DL/UL BWP of DL/UL BWP(s) (by L1 signaling or MAC CE or RRC signaling) configured in a specific time. Switching to another configured DL/UL BWP (by L1 signaling or MAC CE or RRC signaling) may be indicated or switching to a predetermined DL/UL BWP may be performed when a timer value expires based on a timer. In this case, the activated DL/UL BWP is defined as an active DL/UL BWP.

However, if a terminal is in an initial access process or in a situation before an RRC connection is set up, the terminal may not receive a configuration for a DL/UL BWP. In such a situation, a DL/UL BWP assumed by the terminal is defined as an initial active DL/UL BWP.

Hybrid Beamforming

The existing beamforming technology using multiple antennas may be divided into an analog beamforming scheme and a digital beamforming scheme depending on the location where a beamforming weight vector/precoding vector is applied.

The analog beamforming scheme is a beamforming scheme applied to an initial multiple antenna structure. This may mean a scheme for branching an analog signal on which digital signal processing has been completed into a plurality of paths and forming a beam by applying a phase shift (PS) and power amplifier (PA) configuration to each path.

For analog beamforming, there is a need for a structure in which the PA and PS connected to each antenna process an analog signal derived from one digital signal. In other words, the PA and PS of an analog stage process a complex weight.

FIG. 6 shows an example of a block diagram of a transmitter configured with an analog beamformer and RF chains. FIG. 6 is merely for convenience of description and does not limit the range of the present disclosure.

In FIG. 6, the RF chain means a processing block in which a baseband (BB) signal is converted into an analog signal. In the analog beamforming scheme, the accuracy of a beam is determined depending on the characteristics of a PA and PS. The analog beamforming scheme may be advantageous in narrowband transmission in terms of control of the devices.

Furthermore, the analog beamforming scheme has a relatively small multiplexing gain for a transfer rate increase because it is configured with a hardware structure that is difficult to implement multiple stream transmission. Furthermore, in this case, beamforming for each orthogonal resource allocation-based terminal may not be easy.

In contrast, in the digital beamforming scheme, in order to maximize diversity and a multiplexing gain in a MIMO environment, beamforming is performed in a digital stage using a baseband (BB) process.

FIG. 7 shows an example of a block diagram of a transmitter configured with a digital beamformer and RF chains. FIG. 7 is merely for convenience of description and does not limit the range of the present disclosure.

In the case of FIG. 7, beamforming may be performed as precoding is performed in a BB process. In this case, an RF chain includes a PA. The reason for this is that in the digital beamforming scheme, a complex weight derived for beamforming is directly applied to transmission data.

Furthermore, multiple user beamforming may be supported at the same time because different beamforming may be performed for each terminal. Furthermore, the flexibility of scheduling is improved because independent beamforming is possible for each terminal to which an orthogonal resource has been allocated. Accordingly, an operation of a transmitter complying with a system object is possible. Furthermore, in the environment in which wideband transmission is supported, if a technology, such as MIMO-OFDM, is applied, an independent beam may be formed for each subcarrier.

Accordingly, the digital beamforming scheme can maximize a maximum transfer rate of one terminal (or user) based on a capacity increase of a system and an enhanced beam gain. In the existing 3G/4G (e.g., LTE(-A)) system, the digital beamforming-based MIMO scheme has been introduced based on characteristics, such as those described above.

In an NR system, a massive MIMO environment in which transmission and reception antenna greatly increases may be taken into consideration. In general, in cellular communication, a maximum of transmission and reception antennas applied to the MIMO environment is assumed to be 8. However, as a massive MIMO environment is taken into consideration, the number of transmission and reception antennas may be increased to tens of or hundreds of transmission and reception antennas.

In this case, in the massive MIMO environment, if the above-described digital beamforming technology is applied, a transmitter needs to perform signal processing on hundreds of antennas through a BB process for digital signal processing. Accordingly, the complexity of the signal processing may be greatly increased, and the complexity of a hardware implementation may be greatly increased because RF chains corresponding to the number of antennas are necessary.

Furthermore, the transmitter requires independent channel estimation for all the antennas. Furthermore, in the case of the FDD system, pilot and/or feedback overhead may excessively increase because the transmitter requires feedback information for massive MIMO channels configured with all the antennas.

In contrast, in the massive MIMO environment, if the above-described analog beamforming technology is applied, the hardware complexity of the transmitter is relatively low. In contrast, an increment of performance using multiple antennas is very small, and the flexibility of resource allocation may be reduced. In particular, upon wideband transmission, to control a beam for each frequency is not easy.

Accordingly, in the massive MIMO environment, only one of the analog beamforming and digital beamforming schemes is not exclusively selected, but a hybrid type transmitter configuration method in which analog beamforming and digital beamforming structures have been combined is necessary.

Analog Beam Scanning

In general, analog beamforming may be used in a pure analog beamforming transmitter and receiver and a hybrid beamforming transmitter and receiver. In this case, analog beam scanning may perform estimation on one beam at the same time. Accordingly, a beam training time necessary for beam scanning is proportional to a total number of candidate beams.

As described above, in the case of analog beamforming, a beam scanning process in the time domain is essentially necessary for transmitter and receiver beam estimation. In this case, an estimation time Ts for all transmission and reception beams may be represented like Equation 3.

$$T_S = t_s \times (K_T \times K_R) \quad \text{[Equation 3]}$$

In Equation 3, $t_s$ means a time necessary for one beam scanning, $K_T$ means the number of transmission beams, and KR means the number of reception beams.

FIG. 8 shows examples of analog beam scanning methods.

In the case of FIG. 8, it is assumed that a total number of transmission beams $K_T$ is L and a total number of reception beams KR is 1. In this case, a total number of candidate beams is L, and thus an L time interval is necessary in the time domain.

In other words, for analog beam estimation, only one beam estimation may be performed in one time interval. As shown in FIG. 8, an L time interval is necessary to perform all L beams ($P_1$ to $P_L$) estimation. After an analog beam estimation procedure is terminated, a terminal feeds the identification (e.g., ID) of a beam having the highest signal intensity back to a base station. That is, a longer training time may be necessary as the number of beams increases according to an increase in the number of transmission and reception antennas.

In analog beamforming, a training interval for an individual beam needs to be guaranteed unlike in digital beamforming because the size of a continuous waveform in a time domain and a phase angle are changed after a digital-to-analog converter (DAC). Accordingly, as the length of the training interval increases, efficiency of a system may be reduced (i.e., a loss of a system may be increased).

FIG. 9 is a diagram that compares beam scanning application methods. FIG. 9(a) is an Exhaustive search method, and FIG. 9(b) is a Multi-level search method.

The number of search spaces (The No. of search space) of the Exhaustive search method is listed in Table 4 below.

TABLE 4

|  | Beam-width: 1° | Beam-width: 5° | Beam-width: 10° |
| --- | --- | --- | --- |
| 2D | 360 | 72 | 36 |
| 3D | 129,600 | 5,184 | 1,296 |

The number of search spaces of the Multi-level search method is listed in Table 5 below.

TABLE 5

|  | Beam-width: 1° | | Beam-width: 10° | |
| --- | --- | --- | --- | --- |
|  | Coarse beam | Fine beam | Coarse beam | Fine beam |
| 2D | 8 | 45 | 8 | 4.5 |
| 3D | 64 | 2,025 | 64 | 20.25 |

In relation to feedback, in the Exhaustive search method, the ID of the best transmission beam (Best Tx beam ID) is fed back. In the Multi-level search method, the ID of the best sector beam (Best Sector beam ID) is fed back with respect to a coarse beam, and the ID of the best fine beam (Best fine beam ID) is fed back with respect to a fine beam.

In relation to the industry standard (current industrial and standards), a related standard is not present in the Exhaustive search method, and 802.15.3c and 802.11 ad are present in the Multi-level search method.

More detailed contents in relation to beam scanning are described in [1] J. Wang, Z. Lan, "Beam codebook based beamforming protocol for multi-Gbps millimeter-wave WPAN systems," IEEE J. Select. Areas in Commun., vol. 27, no. 8 [2] J. Kim, A. F. Molisch, "Adaptive Millimeter-Wave Beam Training for Fast Link Configuration," USC CSI's 30th conference [3] T. Nitsche, "Blind Beam Steering: Removing 60 GHz Beam Steering Overhead."

CSI/Beam Reporting

A base station may request a periodic CSI/beam reporting, a semi-persistent CSI/beam reporting (e.g., a periodic report is activated or a plurality of times of consecutive reports are performed for only a specific time interval) or a periodic CSI/beam reporting from a UE.

For a CSI/beam reporting of the UE, the base station needs to transmit a downlink reference signal.

For example, a downlink (DL) physical layer signal of a 3GPP NR system is as follows.

CSI-RS: signal for obtaining DL channel state information (CSI) and DL beam management Tracking RS (TRS): signal for fine time/frequency tracking of a UE DL DMRS: RS for PDSCH demodulation DL phase-tracking RS (PT-RS): RS transmitted for phase noise compensation of a UE Synchronization signal block (SSB): mean a resource block composed of a specific number of consecutive symbols and resource blocks on the time/frequency side consisting of a primary synchronization signal (PSS), a secondary SS, and a PBCH (including a PBCH DMRS) (the same beam is applied to signals within one SSB)

An uplink (UL) physical layer signal of a 3GPP NR system is as follows.

SRS: signal for obtaining UL channel state information (CSI), UL beam management, and antenna port selection UL DMRS: RS for PUSCH demodulation UL phase-tracking RS (PT-RS): RS transmitted for phase noise compensation of a base station In a beamformed system to which (analog) beamforming has been applied, it is necessary to determine a DL transmission (Tx)/reception (Rx) beam pair for the transmission/reception of the downlink reference signal and a UL Tx/Rx beam pair for uplink control information (UCI) (e.g., CSI, ACK/NACK) transmission/reception.

A determination process for the DL and/or UL beam pair may be periodically or aperiodically performed. If the number of candidate beams is many, the process that frequently occurs may not be preferred because overhead for a required reference signal may be great.

It is assumed that after the DL/UL beam pair determination process is completed, a periodic or semi-persistent CSI report is performed. A CSI-RS including a single or a plurality of antenna ports for CSI measurement of a UE may be beamformed with a TRP Tx beam determined as a DL beam and transmitted. A transmission cycle of the CSI-RS may be transmitted equally with or more frequently than a CSI report cycle. Alternatively, an aperiodic CSI-RS may be transmitted according to a CSI report cycle or more frequently than the CSI report cycle.

A UE may transmit measured CSI through an UL Tx beam periodically predetermined in an UL beam pair determination process. In a periodic or semi-persistent CSI/beam reporting, during a period in which a report has been activated, an uplink (UL) physical channel (e.g., PUCCH, PUSCH) for a CSI/beam reporting is assigned to the UE in a specific cycle.

CSI report information may include at least one of the following parameters.

Rank indicator (RI): information on how many layers/streams are desired to be simultaneously received Precoding Matrix Indicator (PMI): information on which MIMO precoding is desired to be applied by a base station Channel quality information (CQI): channel quality information in which strength of a desired signal and strength of an interference signal are considered CSI-RS resource indicator (CRI): a preferred CSI-RS resource index among a plurality of CSI-RS resources (to which different beamformings are applied)

Layer indicator (LI): the index of a layer having the best quality

Hereinafter, a beam management procedure is specifically described.

Beam Management (BM)

A BM procedure as layer 1 (L1)/layer 2 (L2) procedures for acquiring and maintaining a set of base station (e.g., gNB, TRP, etc.) and/or terminal (e.g., UE) beams which may be used for downlink (DL) and uplink (UL) transmission/reception may include the following procedures and terms.

Beam measurement: Operation of measuring characteristics of a beam forming signal received by an eNB or a UE.

Beam determination: Operation of selecting a transmit (Tx) beam/receive (Rx) beam of the eNB or UE by the eNB or UE.

Beam sweeping: Operation of covering a spatial region using the transmit and/or receive beam for a time interval by a predetermined scheme.

Beam report: Operation in which the UE reports information of a beamformed signal based on beam measurement.

The BM procedure may be divided into (1) a DL BM procedure using a synchronization signal (SS)/physical broadcast channel (PBCH) Block or CSI-RS and (2) a UL BM procedure using a sounding reference signal (SRS). Further, each BM procedure may include Tx beam sweeping for determining the Tx beam and Rx beam sweeping for determining the Rx beam.

DL Beam Management (DL BM) Procedure

The DL BM procedure may include (1) transmission of beamformed DL reference signals (RSs) (e.g., CIS-RS or SS Block (SSB)) of the eNB and (2) beam reporting of the UE.

Here, the beam reporting a preferred DL RS identifier (ID)(s) and L1-Reference Signal Received Power (RSRP).

The DL RS ID may be an SSB Resource Indicator (SSBRI) or a CSI-RS Resource Indicator (CRI).

FIG. 10 illustrates an example of beamforming using SSB and CSI-RS.

As illustrated in FIG. 10, an SSB beam and a CSI-RS beam may be used for the beam management. A measurement metric is an L1-RSRP for each resource/block. The SSB may be sued for coarse beam management and the CSI-RS may be sued for fine beam management. The SSB may be used for both the Tx beam sweeping and the Rx beam sweeping. The Rx beam sweeping using the SSB may be performed while the UE changes the Rx beam for the same SSBRI across multiple SSB bursts. Here, one SS burst includes one or more SSBs and one SS burst set includes one or more SSB bursts.

DL BM Using SSB

FIG. 11 is a flowchart showing an example of a downlink beam management procedure using SSB.

A configuration for beam reporting using the SSB is performed during a CSI/beam configuration in an RRC connected state (or RRC connected mode).

The UE receives from the eNB CSI-ResourceConfig IE including CSI-SSB-ResourceSetList including SSB resources used for the BM (S1110).

Table 6 shows an example of CSI-ResourceConfig IE and as shown in Table 6, a BM configuration using the SSB is not separately defined and the SSB is configured like the CSI-RS resource.

configured as {SSBx1, SSBx2, SSBx3, SSBx4, . . . }. SSB index may be defined as 0 to 63.

The UE receives from the eNB the SSB resource based on the CSI-SSB-ResourceSetList (S1120).

When CSI-RS reportConfig associated with reporting of SSBRI and L1-RSRP is configured, the UE (beam) reports to the eNB best SSBRI and L1-RSRP corresponding thereto (S1130).

In other words, when reportQuantity of the CSI-RS reportConfig IE is configured as 'ssb-Index-RSRP', the UE reports to the eNB best SSBRI and L1-RSRP corresponding thereto.

In addition, when the CSI-RS resource is configured in the same OFDM symbol(s) as SSB (SS/PBCH Block) and 'QCL-TypeD' is applicable, the UE may assume that the CSI-RS and the SSB are quasi co-located from the viewpoint of 'QCL-TypeD'.

Here, the QCL TypeD may mean that antenna ports are QCL from the viewpoint of a spatial Rx parameter. When the UE receives a plurality of DL antenna ports having a QCL Type D relationship, the same Rx beam may be applied. Further, the UE does not expect that the CSI-RS is configured in an RE overlapped with the RE of the SSB.

DL BM Procedure Using CSI-RS

When the UE receives a configuration of NZP-CSI-RS-ResourceSet with (higher layer parameter) repetition configured to 'ON', the UE may assume that at least one CSI-RS resource in NZP-CSI-RS-ResourceSet is transmitted to the same downlink spatial domain transmission filter.

In other words, at least one CSI-RS resource in NZP-CSI-RS-ResourceSet is transmitted through the same Tx beam.

Here, at least one CSI-RS resource in NZP-CSI-RS-ResourceSet may be transmitted to different OFDM symbols or transmitted in different frequency domain (i.e. through FDM).

When the UE is a multi-panel UE, at least one CSI-RS resource is a target of FDM.

In addition, when the repetition is configured to "ON", it is related to the Rx beam sweeping procedure of the UE.

TABLE 6

```
-- ASN1START
-- TAG-CSI-RESOURCECONFIG-START
CSI-ResourceConfig ::=            SEQUENCE {
    csi-ResourceConfigId          CSI-ResourceConfigId,
    csi-RS-ResourceSetList        CHOICE {
        nzp-CSI-RS-SSB                SEQUENCE {
            nzp-CSI-RS-ResourceSetList      SEQUENCE (SIZE
(1..maxNrofNZP-CSI-RS-ResourceSetsPerConfig)) OF NZP-CSI-RS-ResourceSetId
OPTIONAL,
            csi-SSB-ResourceSetList         SEQUENCE (SIZE (1..maxNrofCSI-
SSB-ResourceSetsPerConfig)) OF CSI-SSB-ResourceSetId OPTIONAL
        },
        csi-IM-ResourceSetList           SEQUENCE (SIZE (1..maxNrofCSI-IM-
ResourceSetsPerConfig)) OF CSI-IM-ResourceSetId
    },
    bwp-Id                        BWP-Id,
    resourceType                  ENUMERATED { aperiodic, semiPersistent,
periodic },
    ...
}
-- TAG-CSI-RESOURCECONFIGTOADDMOD-STOP
-- ASN1STOP
```

In Table 6, csi-SSB-ResourceSetList parameter represents a list of SSB resources used for beam management and reporting in one resource set. Here, SSB resource set may be The UE does not expect that different periodicities are received at periodicityAndOffset in all CSI-RS resources in NZP-CSI-RS-Resourceset.

In addition, when repetition is configured to 'OFF', the UE does not assume that at least one CSI-RS resource in NZP-CSI-RS-ResourceSet is transmitted to the same downlink spatial domain transmission filter.

In other words, at least one CSI-RS resource in NZP-CSI-RS-ResourceSet is transmitted through different Tx beams.

When the repetition is configured to "OFF", it is related to the Tx beam sweeping procedure of the eNB.

In addition, the repetition parameter may be configured only for CSI-RS resource sets associated with CSI-Report-Config having a report of L1 RSRP or 'No Report (or None)'.

When the UE is configured with CSI-ReportConfig in which reportQuantity is configured as 'cri-RSRP' or 'none', the UE may be configured only with the same number of port (1-port or 2-port) having higher layer parameter 'nrofPorts' for all CSI-RS resources in NZP-CSI-RS-ResourceSet. Here, CSI-ResourceConfig does not include the higher layer parameter "trs-Info" but includes NZP-CSI-RS-ResourceSet configured to the higher layer parameter "repetition" (=ON).

More specifically, with respect to the purpose of the CSI-RS, if parameter repetition is configured and TRS info is not configured in a specific CSI-RS resource set, the CSI-RS is used for beam management.

In addition, if parameter repetition is not configured and TRS info is configured, the CSI-RS is used as a TRS (Tracking Reference Signal).

In addition, if neither parameter repetition nor TRS info is configured, the CSI-RS is used for CSI acquisition.

FIG. 12 illustrates an example of a downlink beam management procedure using a Channel State Information-Reference Signal (CSI-RS).

FIG. 12(a) illustrates an Rx beam determination (or refinement) procedure of the UE and FIG. 12(b) illustrates a Tx beam sweeping procedure of the eNB. Further, FIG. 12(a) illustrates a case where the repetition parameter is configured to 'ON' and FIG. 12(b) illustrates a case where the repetition parameter is configured to 'OFF'.

A procedure for determining the DL beam pair may be composed of combinations of a TRP Tx beam selection procedure in which a base station transmits DL RSs corresponding to a plurality of TRP Tx beams and the UE selects and/or reports one among the TRP Tx beams and a UE Rx beam selection procedure in which the base station repeatedly transmits the same RS corresponding to each TRP Tx beam and the UE measures the repeatedly transmitted signals using different UE Rx beams to select a UE Rx beam.

Referring to FIG. 12(a) and FIG. 13, an Rx beam determination process of the UE will be described.

FIG. 13 is a flowchart showing an example of a RX beam determination process of a UE in the DL BM procedure using CSI-RS.

In the FIG. 13, the UE receives, from the eNB, NZP CSI-RS resource set IE including higher layer parameter repetition through RRC signaling (S1310). Here, the repetition parameter is configured to 'ON'.

The UE repeatedly receives a resource(s) in the CSI-RS resource set configured as repetition 'ON' in different OFDM symbols through the same Tx beam (or DL spatial domain transmission filter) of the eNB (S1320).

At this time, the UE determines its own Rx beam (S1330).

The UE may omit a CSI report, and may transmit, to the base station, a CSI report including a CRT/L1-RSRP (S1340).

In this case, reportQuantity of CSI report Config may be composed of "No report (or None)" or "CRT and L1-RSRP."

That is, if repetition is set as "ON", the UE may omit a CSI report or may report ID information (CRT) of a priority beam related to a beam pair and a quality value (L1-RSRP) thereof.

Referring to FIG. 12(b) and FIG. 14, a Tx beam determination process of the eNB will be described.

FIG. 14 is a flowchart showing an example of a TX beam determination process of an eNB.

The UE receives, from the eNB, NZP CSI-RS resource set IE including higher layer parameter repetition through RRC signaling (S1410).

Here, the repetition parameter is configured to 'OFF' and associated with the Tx beam sweeping procedure of the eNB.

The UE receives a resource(s) in CSI-RS resource set configured as repetition 'OFF' through different Tx beams (DL spatial domain transmission filters) of the eNB (S1420).

The UE selects (or determines) a best beam (S1430), and reports to the eNB an ID for the selected beam and related quality information (e.g., L1-RSRP) (S1440).

In this case, reportQuantity of CSI report config may be configured as 'CRI+L1-RSRP'. In other words, when the CSI-RS is transmitted for the BM, the UE reports to the ENB the CRT and L1-RSRP therefor.

FIG. 15 illustrates an example of resource allocation in time and frequency domains associated with an operation of FIG. 12.

Referring to FIG. 15, when repetition 'ON' is configured in the CSI-RS resource set, a plurality of CSI-RS resources is repeatedly used via the same Tx beam. When repetition 'OFF' is configured in the CSI-RS resource set, different CSI-RS resources are transmitted via different Tx beams.

UL BM Procedure

In the case of UL BM, beam reciprocity (or beam correspondence) between the Tx beam and the Rx beam may be established or not established according to UE implementation. If the reciprocity between the Tx beam and the Tx beam is established in both the eNB and the UE, a UL beam pair may be matched through a DL beam pair. However, when the reciprocity between the Tx beam and the Rx beam is not established even in any one of the eNB and the UE, a UL beam pair determination process is required apart from a DL beam pair determination.

Further, even when the eNB and the UE maintain beam correspondence, the eNB may use a UL BM procedure in order to determine a DL Tx beam without requesting report of a preferred beam by the UE.

The UL BM may be performed through beamformed UL SRS transmission and whether to apply UL BM of the SRS resource set is configured by a (higher layer parameter) usage. When the usage is configured as 'BeamManagement (BM)', only one SRS resource may be transmitted to each of a plurality of SRS resource sets at a given time instant.

The UE may be configured with one or more Sounding Reference Symbol (SRS) resource sets configured by (higher layer parameter) SRS-ResourceSet (through higher layer signaling, RRC signaling, etc.). For each SRS resource set, the UE may be configured with K ($\geq 1$) SRS resources (higher later parameter SRS-resources). Here, K is a natural number and a maximum value of K is indicated by SRS_capability.

Similarly to the DL BM, a UL BM procedure may also be divided into Tx beam sweeping of the UE and Rx beam sweeping of the eNB.

FIG. 16 illustrates an example of an uplink beam management procedure using a Sounding Reference Signal (SRS).

FIG. 16(a) illustrates an Rx beam determination procedure of the eNB and FIG. 16(b) illustrates a Tx beam sweeping procedure of the UE.

A procedure for determining the UL beam pair may be composed of combinations of a UE Tx beam determination procedure in which a UE transmits UL RSs corresponding to a plurality of UE Tx beams to a base station and the base station selects and/or signals one among the UE Tx beams, and a TRP Rx beams determination procedure in which the UE repeatedly transmits the same RS corresponding to each UE Tx beam to the base station and the base station measures the repeatedly transmitted signals using different TRP Rx beams.

FIG. 17 is a flowchart showing an example of an uplink beam management procedure using the SRS.

The UE receives, from the eNB, RRC signaling (e.g., SRS-Config IE) including a (higher layer parameter) usage parameter configured as 'beam management' (S1710).

Table 7 shows an example of SRS-Config Information Element (IE) and SRS-Config IE is used for an SRS transmission configuration. SRS-Config IE includes a list of SRS-Resources and a list of SRS-ResourceSets. Each SRS resource set means a set of SRS-resources.

The network may trigger transmission of the SRS resource set by using configured aperiodicSRS-Resource-Trigger (L1 DCI).

TABLE 7

```
-- ASN1START
-- TAG-MAC-CELL-GROUP-CONFIG-START
SRS-Config ::=                                   SEQUENCE {
    srs-ResourceSetToReleaseList                 SEQUENCE (SIZE(1..maxNrofSRS-
ResourceSets)) OF SRS-ResourceSetId                  OPTIONAL,         -- Need N
    srs-ResourceSetToAddModList                  SEQUENCE (SIZE(1..maxNrofSRS-
ResourceSets)) OF SRS-ResourceSet                    OPTIONAL,         -- Need N
    srs-ResourceToReleaseList                    SEQUENCE (SIZE(1..maxNrofSRS-
Resources)) OF SRS-ResourceId                        OPTIONAL,         -- Need N
    srs-ResourceToAddModList                     SEQUENCE (SIZE(1..maxNrofSRS-
Resources)) OF SRS-Resource                          OPTIONAL,         -- Need N
    tpc-Accumulation                             ENUMERATED {disabled}
    ...
}
SRS-ResourceSet ::=                              SEQUENCE {
    srs-ResourceSetId                            SRS-ResourceSetId,
    srs-ResourceIdList                           SEQUENCE (SIZE(1..maxNrofSRS-
ResourcesPerSet)) OF SRS-ResourceId                  OPTIONAL, -- Cond Setup
    resourceType                                 CHOICE {
        aperiodic                                    SEQUENCE {
            aperiodicSRS-ResourceTrigger                 INTEGER (1..maxNrofSRS-
TriggerStates-1),
            csi-RS                                       NZP-CSI-RS-ResourceId
            slotOffset                                   INTEGER (1..32)
            ...
        },
        semi-persistent                              SEQUENCE {
            associatedCSI-RS                             NZP-CSI-RS-ResourceId
            ...
        },
        periodic                                     SEQUENCE {
            associatedCSI-RS                             NZP-CSI-RS-ResourceId
            ...
        }
    },
    usage                                        ENUMERATED {beamManagement,
codebook, nonCodebook, antennaSwitching},
    alpha                                        Alpha
    p0                                           INTEGER (-202..24)
    pathlossReferenceRS                          CHOICE {
        ssb-Index                                    SSB-Index,
        csi-RS-Index                                 NZP-CSI-RS-ResourceId
SRS-SpatialRelationInfo ::=                  SEQUENCE {
    servingCellId                                ServCellIndex
        OPTIONAL,       -- Need S
    referenceSignal                              CHOICE {
        ssb-Index                                    SSB-Index,
        csi-RS-Index                                 NZP-CSI-RS-ResourceId,
        srs                                          SEQUENCE {
            resourceId                                   SRS-ResourceId,
            uplinkBWP                                    BWP-Id
        }
    }
}
SRS-ResourceId ::=                               INTEGER (0..maxNrofSRS-Resources-1)
```

In Table 7, usage represents a higher layer parameter indicating whether the SRS resource set is used for the beam management or whether the SRS resource set is used for codebook based or non-codebook based transmission. The usage parameter corresponds to L1 parameter 'SRS-SetUse'. 'spatialRelationInfo' is a parameter representing a configuration of a spatial relation between a reference RS and a target SRS. Here, the reference RS may become SSB, CSI-RS, or SRS corresponding to L1 parameter 'SRS-SpatialRelationInfo'. The usage is configured for each SRS resource set.

The UE determines a Tx beam for an SRS resource to be transmitted based on SRS-SpatialRelation Info included in the SRS-Config IE (S1720). Here, SRS-SpatialRelation Info is configured for each SRS resource and represents a beam which is the same as the beam used in the SSB, the CSI-RS, or the SRS is to be applied for each SRS resource. Further, SRS-SpatialRelationInfo may be configured or not configured in each SRS resource.

If SRS-SpatialRelationInfo is configured in the SRS resource, SRS-SpatialRelationInfo is transmitted by applying the beam which is the same as the beam used in the SSB, the CSI-RS, or the SRS. However, if SRS-SpatialRelationInfo is not configured in the SRS resource, the UE arbitrarily determines the Tx beam and transmits the SRS through the determined Tx beam (S1730).

More specifically, for P-SRS in which 'SRS-ResourceConfigType' is configured as 'periodic':

i) When SRS-SpatialRelationInfo is configured as 'SSB/PBCH', the UE transmits the corresponding SRS resource by applying a spatial domain transmission filter which is the same as a spatial domain Rx filter used for receiving the SSB/PBCH (or generated from the corresponding filter); or ii) When SRS-SpatialRelationInfo is configured as 'CSI-RS', the UE transmits the SRS resource by applying the same spatial domain transmission filter used for receiving periodic CSI-RS or SP CSI-RS; or iii) When SRS-SpatialRelationInfo is configured as 'SRS', the UE transmits the SRS resource by applying the same spatial domain transmission filter used for transmitting the periodic CSI-RS.

Even when 'SRS-ResourceConfigType' is configured as 'SP-SRS' or 'AP-SRS', beam determination and transmission operations may be applied similarly thereto.

Additionally, the UE may receive or not receive a feedback for the SRS from the eNB like three following cases (S1740).

i) When Spatial_Relation_Info is configured for all SRS resources in the SRS resource set, the UE transmits the SRS with the beam indicated by the eNB. For example, when all Spatial_Relation_Info indicates the same SSB, CRI, or SRI, the UE repeatedly transmits the SRS with the same beam. This case as a usage of selecting the Rx beam by the eNB corresponds to FIG. 16(*a*).

ii) Spatial_Relation_Info may not be configured for all SRS resources in the SRS resource set. In this case, the UE may transmit the SRS while arbitrarily changing the SRS beam. In other words, this case as a usage of selecting the Tx beam by the UE corresponds to FIG. 16(*b*).

iii) Spatial_Relation_Info may be configured for some SRS resources in the SRS resource set. In this case, the SRS may be transmitted with the beam configured for the configured SRS resource and the UE may arbitrarily transmit the SRS by applying the Tx beam to an SRS resource in which Spatial_Relation_Info is not configured.

Beam Failure Recovery (BFR) Procedure

In a Beamformed system, a Radio Link Failure (RLF) may often occur due to a UE's rotation, movement, or beam blockage. Accordingly, in order to prevent frequent occurrence of the RLF, RFR is supported in NR. The BFR may be similar to a radio link failure recovery procedure and supported when a UE knows a new candidate beams(s).

A UE may determine whether a beam failure event occurs through received quality of a downlink reference signal. A report message for the beam failure or a message for a beam recovery request (e.g., a beam failure recovery request (BFRQ) message) needs to be transmitted by the UE. A base station that has received the message may perform beam RS transmission for beam recovery, beam failure recovery (BFR) through a beam reporting request, etc.

Prior to a description of the beam failure recovery procedure, (1) radio link monitoring and (2) link recovery procedures will be described first in brief 1. Radio Link Monitoring A DL radio link quality of a primary cell is monitored by a UE in order to indicate an out-of-sync or in-sync state to higher layers. The term "cell" used in the present disclosure may be a component carrier, a carrier, a BW, and the like. A UE does not need to a DL radio link quality in a DL BWP other than an active DL BWP on the primary cell.

The UE may be configured for each DL BWP of SpCell having a set of resource indexes through a set corresponding to (higher layer parameter) RadioLinkMonitoringRS for radio link monitoring by higher layer parameter failureDetectionResources.

Higher layer parameter RadioLinkMonitoringRS having a CSI-RS resource configuration index (csi-RS-Index) or an SS/PBCH block index (ssb-Index) is provided to the UE.

In the case where RadioLinkMonitoringRS is not provided to the UE and instead TCI-state for PDCCH including one or more RSs including one or more from a CSI-RS and/or an SS/PBCH block is provided to the UE,

- when active TCI-state for PDCCH include a single RS, the UE uses the RS, provided for the active TCI-state for PDCCH, for radio link monitoring.
- when active TCI-state for PDCCH includes two RSs, the UE is not expected to have one RS has QCL-TypeD and use one RS for radio link monitoring. Hereinafter, the UE does not expect that both the two RSs has QCL-TypeD.
- the UE does not use aperiodic RS for radio link monitoring.

The following Table 8 shows an example of RadioLinkMonitoringConfig IE.

The RadioLinkMonitoringConfig IE is used to configure radio link monitoring for detecting a beam failure and/or a cell radio link failure.

TABLE 8

```
-- ASN1START
-- TAG-RADIOLINKMONITORINGCONFIG-START
RadioLinkMonitoringConfig ::=          SEQUENCE {
    failureDetectionResourcesToAddModList       SEQUENCE
(SIZE(1..maxNrofFailureDetectionResources)) OF RadioLinkMonitoringRS          OPTIONAL,
        -- Need N
    failureDetectionResourcesToReleaseList       SEQUENCE
(SIZE(1..maxNrofFailureDetectionResources)) OF RadioLinkMonitoringRS-Id OPTIONAL,-
- Need N
    beamFailureInstanceMaxCount                      ENUMERATED {n1, n2, n3, n4, n5, n6, n8,
n10}                                             OPTIONAL,         -- Need S
    beamFailureDetectionTimer                        ENUMERATED {pbfd1, pbfd2, pbfd3,
pbfd4, pbfd5, pbfd6, pbfd8, pbfd10}              OPTIONAL,         -- Need R
    ...
}
RadioLinkMonitoringRS ::=              SEQUENCE {
    radioLinkMonitoringRS-Id             RadioLinkMonitoringRS-Id,
    purpose                              ENUMERATED {beamFailure, rlf, both},
    detectionResource                    CHOICE {
        ssb-Index                            SSB-Index,
        csi-RS-Index                         NZP-CSI-RS-ResourceId
    },
    ...
}
-- TAG-RADIOLINKMONITORINGCONFIG-STOP
-- ASN1STOP
```

In Table 8, the parameter beamFailureDetectionTimer is a timer for beam failure detection.

The parameter beamFailureDetectionTimer indicates that the UE triggers a beam failure recovery after how many beam failure events.

Value n1 corresponds to 1 beam failure instance, and value n2 corresponds to 2 beam failure instances. If a network reconfigures a corresponding fields, the UE resets a counter related to on-goingbeamFailureDetectionTimer and beamFailureInstanceMaxCount.

If there is no corresponding field, the UE does not trigger a beam failure recovery.

Table. 9 shows an example of BeamFailureRecoveryConfig IE.

For beam failure detection, the BeamFailureRecoveryConfig IE is used to configure the UE with RACH resources and candidate beams for beam failure recovery.

TABLE 11

```
-- ASN1START
-- TAG-BEAM-FAILURE-RECOVERY-CONFIG-START
BeamFailureRecoveryConfig ::=          SEQUENCE {
    rootSequenceIndex-BFR              INTEGER (0..137)
    rach-ConfigBFR                     RACH-ConfigGeneric
    rsrp-ThresholdSSB                  RSRP-Range
    candidateBeamRSList                SEQUENCE
(SIZE(1..maxNrofCandidateBeams)) OF PRACH-ResourceDedicatedBFR          OPTIONAL,
    ssb-perRACH-Occasion               ENUMERATED {oneEighth, oneFourth,
oneHalf, one, two, four, eight, sixteen}   OPTIONAL,      -- Need M
        ra-ssb-OccasionMaskIndex       INTEGER (0..15)
        recovery SearchSpaceId         SearchSpaceId
        ra-Prioritization              RA-Prioritization
        beamFailureRecoveryTimer       ENUMERATED {ms10, ms20, ms40, ms60,
ms80, ms100, ms150, ms200}         OPTIONAL,      -- Need M
    ...
}
PRACH-ResourceDedicatedBFR ::=          CHOICE {
    ssb                                BFR-SSB-Resource,
    csi-RS                             BFR-CSIRS-Resource
}
BFR-SSB-Resource ::=                   SEQUENCE {
    ssb                                SSB-Index,
    ra-PreambleIndex                   INTEGER (0..63),
    ...
}
BFR-CSIRS-Resource ::=                 SEQUENCE {
    csi-RS                             NZP-CSI-RS-ResourceId,
    ra-OccasionList                    SEQUENCE (SIZE(1..maxRA-OccasionsPerCSIRS)) OF
INTEGER (0..maxRA-Occasions-1)     OPTIONAL,      -- Need R
    ra-PreambleIndex                   INTEGER (0..63)
    ...
}
-- TAG-BEAM-FAILURE-RECOVERY-CONFIG-STOP
-- ASN1STOP
```

In Table 9, the parameter beamFailureRecoveryTimer is a parameter indicative of a timer for beam failure recovery, and a value of the parameter is set to ms.

The parameter candidateBeamRSList is a parameter indicative of a list of reference signals (CSI-RS and/or SSB) to identify random access (RA) parameters associated with candidate beams for recovery.

The parameter RecoverySearchSpaceId represents a search space used for BFR random access response (RAR).

If radio link quality is poorer than the threshold Qout for all resources in the set of resources for radio link monitoring, the physical layer of a UE indicates the out-of-sync status for a higher layer within a radio frame whose radio link quality was measured.

If the radio link quality for any resource in resource set for radio link monitoring is better than the threshold Qin, the physical layer of the UE indicates the in-sync status for a higher layer within a radio frame whose radio link quality was measured.

2. Link Recovery Procedure

A UE is provided, for a serving cell, with a set q0 of periodic CSI-RS resource configuration indexes by higher layer parameter failureDetectionResources, and a set q1 of periodic CSI-RS resource configuration indexes and/or SS/PBCH block indexes by candidateBeamRSList for measuring a radio link quality on the serving cell.

If the UE is not provided with higher layer parameter failureDetectionResources, the UE determines the set q0 to include SS/PBCH block indexes and periodic CSI-RS resource configuration indexes with same values as the RS indexes in the RS sets indicated by the TCI states for respective control resource sets that the UE uses for monitoring PDCCH.

If a threshold Qout_LR corresponds to the default value of higher layer parameter rlmInSyncOutOfSyncThreshold and to the value provided by higher layer parameter rsrp-ThresholdSSB, respectively.

The physical layer of the UE evaluates the radio link quality according to the set q0 of resource configurations against the threshold Qout_LR.

For the set q0, the UE assesses the radio link quality only according to periodic CSI-RS resource configurations or SS/PBCH blocks that are quasi co-located with the DM-RS of PDCCH receptions monitored by the UE.

The UE applies a Qin_LR threshold to a L1-RSRP measurement obtained from the SS/PBCH block.

The UE applies the Qin_LR threshold to the L1-RSRP measurement obtained for a CSI-RS resource after scaling a respective CSI-RS reception power with a value provided by higher layer parameter powerControlOffsetSS.

The physical layer in the UE provides an indication to higher layers when the radio link quality for all corresponding resource configurations in the set that the UE uses to assess the radio link quality is worse than the threshold Qout_LR.

The physical layer informs the higher layers when the radio link quality is worse than the threshold Qout_LR with a periodicity determined by the maximum between the shortest periodicity of periodic CSI-RS configurations or SS/PBCH blocks in the set q0 that the UE uses to assess the radio link quality and 2 msec.

Upon request from higher layers, the UE provides to the higher layers the periodic CSI-RS configuration indexes and/or SS/PBCH block indexes from the set q1 and the corresponding L1-RSRP measurements that are larger than or equal to the corresponding thresholds.

A UE may be provided with a control resource set through a link to a search space set provided by higher layer parameter recoverySearchSpaceId for monitoring PDCCH in the control resource set.

If the UE is provided higher layer parameter recoverySearchSpaceId, the UE does not expect to be provided another search space set for monitoring PDCCH in the control resource set associated with the search space set provided by recoverySearchSpaceId.

The aforementioned BFD and BFR procedure will be described again.

If beam failure is detected on a serving SSB or a CSI-RS(s), a BFR procedure used to indicate a new SSB or CSI-RS to a serving base station may be configured by RRC.

The RRC configures BeamFailureRecoveryConfig for a beam failure detection and recovery procedure.

The BFR procedure may include (1) a step of beam failure detection, (2) a step of new beam indication, a step of Beam Failure Recovery Request (RFRQ), and (4) a step of monitoring a response to the BFRQ from a base station.

Hereinafter, for the step (3), that is, for transmission of the BFRQ, a PRACH preamble or a PUCCH may be used.

The step (1), that is, beam failure detection will be described in more detail.

When block error rates (BLERs) of all serving beams are a threshold or more, it is called a beam failure instance (BFI).

As a detailed example, if all PDCCH beams drop to a predetermined quality value (e.g., Q_out) or less, one beam failure instance occurs. In this case, the quality may be based on a hypothetical BLER. In other words, assuming that control information has been transmitted through a corresponding PDCCH, the quality may be based on the probability that the demodulation of corresponding information may fail. In this case, as described above, when the BLER is a threshold or more, a BFI may be indicated. That is, one or more search spaces in which a PDCCH will be monitored may be configured in a UE. The beams may be differently configured for each search space. In this case, if the BLERs of all the PDCCH beams are a threshold or more, a BFI may be indicated.

RSs to be monitored by a UE may be explicitly configured by RRC or are implicitly determined by a beam RS for a control channel.

Specifically, a control resource set (CORESET) ID, that is, a resource region in which a PDCCH may be transmitted is configured in each search space. RS information (e.g., CSI-RS resource ID, SSB ID) QCLed in a spatial RX parameter viewpoint may be indicated/configured for each CORESET ID (in the NR standard, a QCLed RS may be indicated/configured through transmit configuration information (TCI) indication). In this case, the RS QCLed in the spatial RX parameter viewpoint (e.g., QCL Type D) means a method of a base station notifying a UE that the UE has to use (or may use) a beam used for corresponding spatially QCLed RS reception in corresponding PDCCH DMRS reception without any change. As a result, in the base station viewpoint, the UE may be notified that the same transmission beam or a similar transmission beam (e.g., if beams having the same/similar beam direction and have different beam bandwidths) is applied and transmitted through spatially QCLed antenna ports.

Alternatively, the base station may explicitly configure a beam RS(s) as beam failure detection. In this case, a corresponding beam RS(s) may correspond to the 'all the PDCCH beams.'

An indication of the beam failure instance to higher layer is periodic, and an indication interval is determined by the shortest periodicity of BFD RS set.

If an evaluation is lower than a beam failure instance BLER threshold, there is no indication to higher layer.

When N number of consecutive beam failure instances has occurred, a beam failure is declared.

Hereinafter, N is the parameter NrofBeamFailureInstance which is configured by RRC.

1-port CSI-RS and SSB are supported for a BFD RS set.

Next, the step (2), that is, new beam indication will be described.

A network NW may transmit configuration of one or multiple PRACH resources/sequences to a UE.

A PRACH sequence is mapped to at least one new candidate beam.

The UE selects a new beam from among candidate beams having L1-RSRP equal to or greater than a threshold configured by RRC, and transmits a PRACH via the selected beam. In this case, which beam the UE selects may be an UE implementation issue.

Specifically, the UE may search for a beam having a predetermined quality value (Q_in) or more among RSs configured in a candidate beam RS set by the base station. The RS beam set configured by the base station may include the following three cases. All beam RSs within the RS beam set may be composed of SSBs. Alternatively, all beam RSs within RS beam set may be composed of CSI-RS resources. Alternatively, beam RSs within the RS beam set may be composed of SSBs and CSI-RS resources. For example, if one beam RS exceeds a threshold, a corresponding beam RS may be selected. If a plurality of beam RS exceeds a threshold, a random one of corresponding beam RSs may be selected. In this case, beam quality is based on RSRP.

If a beam exceeding the threshold is not present, the UE may search for a beam having a predetermined quality value (Q_in) or more among SSBs (connected to a contention based PRACH resource). If one SSB exceeds the threshold, a corresponding beam RS may be selected. If a plurality of SSB exceeds the threshold, a random one of corresponding beam RSs may be selected.

If a beam exceeding the threshold is not present, the UE may select a random SSB among SSBs (connected to a contention based PRACH resource).

Next, the steps (3) and (4), that is, transmitting a BFRQ and monitoring a response to the BRFQ will be described.

A dedicated CORESET may be configured by RRC to monitor time duration of a window and the response to the BFRQ from the base station.

The UE starts to monitor the response after 4 slots of PRACH transmission.

The UE assumes that the dedicated CORESET is spatial QCL with a DL RS of a UE-identified candidate beam in the beam failure recovery request.

If the timer expires or when the number of PRACH transmission reaches the maximum number, the UE stops the BFR procedure.

Hereinafter, the maximum number of PRACH transmissions and the timer are configured by RRC.

Specifically, the UE may transmit, to the base station, a PRACH resource and preamble directly or indirectly connection-configured with the beam RS (e.g., CSI-RS or SSB) selected at step (2). In this case, the direct connection configuration may be used if i) a contention-free PRACH resource and preamble are configured for a specific RS within a candidate beam RS set separately configured for each BFR use or if ii) (contention based) PRACH resources and preambles mapped to SSBs universally configured for other uses, such as random access, in a one-to-one manner are configured. The indirect connection configuration may be used if a contention-free PRACH resource and preamble are not configured for a specific CSI-RS within a candidate beam RS set separately configured for each BFR use. At this time, the UE may select a (contention-free) PRACH resource and preamble connected to a (e.g., quasi-co-located (QCLed) with respect to spatial Rx parameter) SSB designated to be received through the same reception beam as the corresponding CSI-RS.

The UE may monitor the response of the base station (gNB) for the corresponding PRACH transmission. In this case, the response to the contention-free PRACH resource and preamble is transmitted through a PDCCH masked with a C-RNTI, and may be received in a search space in which RRC is separately configured for a BFR use. The search space may be configured in a specific CORESET (for a BFR). The response to the contention PRACH may reuse a CORESET (e.g. CORESET 0 or CORESET 1) and search space configured for a common contention PRACH based random access process without any change.

If a response is not present for a given time, the steps (2) to (4) may be repeated. The repetition process may be performed until PRACH transmission reaches a preset maximum number N_max or a set timer expires. When the timer expires, the UE stops contention free PRACH transmission, but may perform contention based PRACH transmission based on SSB selection until N_max is reached.

In the NR system, a random access and BFD/BFR procedure is related to a multi-beam operation. If an unlicensed spectrum operates as the same SpCell as a Pcell or a PScell, a UE needs to perform the two procedures.

FIG. 18 is an example of a beam failure detection (BFD) procedure of a conventional method in NR-U.

Referring to FIG. 18, in order to trigger a BFR procedure, a UE may perform the BFD procedure using BFI_COUNTER and beamfailuredetectionTimer. When a BFI is indicated from a lower layer, the UE increases BFI_COUNTER by 1. In general, the physical layer of the UE checks serving beam quality by measuring a reference signal periodically transmitted by a network. If the quality of the reference signal is bad, the physical layer transmits a beam failure instance indication to the MAC layer. However, a base station in an unlicensed band may not transmit a downlink reference signal due to an LBT failure. The UE does not distinguish between a case where a reference signal is not transmitted (skipped) and a case where quality of the reference signal is bad. Accordingly, as illustrated in FIG. 18, in both the cases, a BFI may be indicated from a lower layer.

As described above, the UE operating according to the existing beam failure detection method may measure a hypothetical block error rate (hereinafter BLER) based on received quality of a corresponding downlink reference signal at a corresponding resource element (RE) location with respect to a downlink reference signal (e.g., SSB or periodic CSI-RS) whose transmission periodicity has been set as "periodic." If the corresponding downlink reference signal is not transmitted at a specific timing (for a reason, such as a listen-before-talk (LBT)), the UE may estimate a very high BLER at the corresponding timing and thus count a beam failure instance (BFI). Accordingly, if the non-transmission of a reference signal is repeated or persistent for a specific time interval, the UE determines the non-transmission as a beam failure state, and (repeatedly) performs a (search) operation for searching for PRACH transmission for the reference signal of a new beam and a base station response to a corresponding PRACH.

Although a downlink reference signal is in the state in which it is not temporarily transmitted (if UE mobility is small), the probability that a serving beam does not need to be actually changed may be very high. However, as described above, even in the case where a base station does not transmit a downlink reference signal in addition to a case where a base station transmitted a downlink reference signal and quality of the corresponding downlink reference signal is degraded, a UE may determine such a case as a beam failure. Accordingly, there may be a problem in that the UE unnecessarily consumes power in order to change a beam.

Hereinafter, the present disclosure proposes a method of performing beam failure detection in a wireless communication system in which it is difficult to periodically transmit a downlink reference signal (RS) like an unlicensed band, in particular. Specifically, in order to prevent unnecessary power consumption due to a beam change of the UE, a method of determining whether a beam fails by distinguishing between a case in which the quality of a reference signal is degraded and a case in which the reference signal is not transmitted is proposed.

<Method 1>

A method of determining whether a beam has failed based on only a downlink reference signal triggered by DCI (in a specific band, such as an unlicensed band, or based on a configuration of a base station) may be considered. That is, whether a beam has failed may be determined by performing beam measurement only if reference signal transmission is certain through DCI triggering.

An aperiodic CSI-RS (including an aperiodic TRS) may be considered as a downlink reference signal triggered by DCI. Alternatively, a multi-shot CSI-RS in which the same downlink reference signal resource is repeatedly transmitted multiple times by DCI may also be considered.

Furthermore, whether a beam failure instance (BFI) (hereinafter BFI) needs to be determined based on which one of multiple downlink reference signals may also be indicated by DCI. For example, multiple CSI-RS resources (set) may be configured through RRC or a MAC-CE, and one of multiple CSI-RS resources (set) may be dynamically indicated through DCI. A UE may determine a BFI based on one CSI-RS resource (set) indicated through DCI.

The method can solve a problem in that a UE determines a case where a base station does not transmit a downlink reference signal as a BFI in a conventional method, because the UE determines whether or not the BFI only when the UE successfully receives DCI, that is, when the base station certainly transmits a downlink reference signal.

The UE may determine a BFI according to the aforementioned method, and may report a result of the determination to a higher layer. In this case, a timing at which the report is transmitted to a higher layer may be aperiodic. For example, a timing at which a BFI is determined/reported may be determined as one of the followings.

a slot in which DCI to trigger a downlink reference signal is received (plus a specific time offset)
a slot in which a downlink reference signal is transmitted when DCI to trigger the corresponding downlink reference signal is received (plus a specific time offset)
PUSCH (or PUCCH) transmission slot assigned to perform a report for a downlink reference signal when DCI to trigger the corresponding downlink reference signal is received (plus a specific time offset)

<Method 2>

A method of setting a threshold on which a UE may determine that a reference signal has not been transmitted may be considered. If received quality of a downlink reference signal measured at a specific timing by a UE (in a specific band, such as an unlicensed band) is equal to or less than a specific threshold, it is determined that the corresponding downlink reference signal is not transmitted at the corresponding downlink reference signal transmission timing (although a hypothetical BLER is Q_out or more), which is not determined as a BFI. At this time, it may be reported the non-transmission of the reference signal (e.g., no beam instance) from the physical layer to a higher layer or may be determined/reported no beam failure (e.g., no BFI).

For example, if a reference signal received power (RSRP) value of a downlink reference signal is equal to or less than a specific threshold, a UE may not determine the corresponding downlink reference signal as a beam failure instance (BFI). If a base station does not transmit a downlink reference signal, an RSRP value will be very low at a corresponding timing. Accordingly, a threshold for RSRP may be set. When the RSRP is too low, a corresponding downlink reference signal may be determined to be not transmitted. Such a method can support a beam failure detection operation based on a periodic reference signal in addition to an aperiodic reference signal.

For another example, if a hypothetical BLER estimated through a downlink reference signal is equal to or higher than a specific threshold, a UE may be configured not to determine the corresponding downlink reference signal as a BFI. If a base station does not transmit a downlink reference signal, a hypothetical BLER will suddenly rise at a corresponding timing. Accordingly, a BLER threshold may be set. When the BLER is too higher than the threshold, a corresponding downlink reference signal may be determined to be not transmitted. That is, the corresponding downlink reference signal is determined based on the BLER, but a Q_out threshold for determining a beam failure instance (BFI) and a threshold for determining no reference signal may be separately regulated (set).

As a detailed example, in a conventional method, no beam failure (e.g., no BFI) is determined when BLER<Q_out, and the occurrence of a beam failure instance (BFI) is determined when BLER>Q_out. Meanwhile, according to the method proposed in the present disclosure, the following operation may be performed.

BLER<Q_out1 (e.g., 10%): no beam failure (no BFI)
Q_out1<BLER<Q_out2 (e.g., 25%): beam failure instance (BFI) indication
BLER>Q_out2: no beam (no beam instance, NBI)

In this case, Q_out1 indicates a threshold for determining a beam failure instance. Q_out2 indicates a threshold for determining no reference signal (no beam). A UE may report, to a higher layer, non-transmission of a reference signal (e.g., no beam instance) in a physical layer or may determine/report no beam failure (e.g., no BFI) only when a calculated BLER value is greater than Q_out2. Such a method may support a beam failure detection operation based on a periodic reference signal in addition to an aperiodic reference signal.

The proposed methods may be different from an operation of performing beam failure detection based on the existing periodic reference signal. Accordingly, a base station may explicitly or implicitly indicate that a UE will perform/apply which one of beam failure detection methods. The indication may be separately configured in any one unit of a band, a component carrier (CC) or a bandwidth part (BWP). For example, an indication that a beam failure detection operation needs to be performed based on a reference signal triggered by DCI may be indicated through specific configuration information (e.g., SIBx for an unlicensed band operation) that implicitly implies an unlicensed band operation.

FIG. 19 illustrates an example of an operational flowchart of a UE that performs beam failure detection to which a method proposed in the present disclosure may be applied. FIG. 19 is merely for convenience of description, and does not restrict the scope of the present disclosure.

Referring to FIG. 19, a case where a UE and/or a base station operates based on the methods and/or embodiments of the aforementioned method 1 to method 2 is assumed. Furthermore, it may be assumed that beam failure detection in an unlicensed band is performed. Some of steps described with reference to FIG. 19 may be merged or omitted.

The UE may receive a reference signal (RS) from the base station (S1910). The reference signal may be periodically or aperiodically transmitted by the base station. The reference signal may correspond to a reference signal triggered by downlink control information (DCI). For example, the reference signal triggered by the DCI may correspond to an aperiodic channel state information-RS (CSI-RS).

Prior to the step S1910, the UE may receive, from the base station, configuration information for a reference signal to be used to determine whether a beam has failed among multiple downlink reference signals (S1905). For example, multiple CSI-RS resources (set) may be configured through RRC or a MAC-CE, and one CSI-RS resource (set) to be used to determine whether a beam has failed may be indicated through DCI. This step may be omitted according to circumstances.

The UE may receive, from the base station, information on a criterion (method) for determining whether a beam has failed (S1915). This step may be omitted according to circumstances. Furthermore, the steps S1905 and S1915 may be merged and performed in one step. The information on the criterion for determining whether a beam has failed may be configured in any one unit of a band, a component carrier (CC) or a bandwidth part (BWP). The information on the criterion (method) for determining whether a beam has failed may include information that explicitly or implicitly indicates a beam failure detection method to be performed by the UE among multiple beam failure detection methods.

The UE may determine whether a beam has failed based on the reference signal (S1920). That is, the UE may determine whether a beam has failed by performing measurement on the reference signal. For example, a method for the UE to determine whether a beam has failed may be based on the aforementioned method 1 to method 2. The UE may divide the determination into i) a case where the base station does not transmit a reference signal and ii) a case where quality of a reference signal transmitted by the base station does not satisfy a specific threshold range, and may determine that the beam has failed only in the case ii). In other words, if the base station does not transmit a reference signal, although a measured value does not satisfy a specific threshold range, it may not be determined as a beam failure.

As a detailed example, whether a beam has failed may be determined based on one of reference signal received power (RSRP) or a block error rate (BLER) calculated by performing the measurement on the reference signal. If the RSRP is equal to or lower than a specific threshold, it may be determined as the i) case where the base station does not transmit a reference signal. If whether a beam has failed is determined based on the BLER, a first threshold on which the i) case where the base station does not transmit a reference signal is determined and a second threshold on which the ii) quality of the reference signal transmitted by the base station is determined may be set separately. If the BLER is smaller than the first threshold and greater than the second threshold, a beam may be determined to have failed. If the BLER is greater than the first threshold, it may be determined as the i) case where the base station does not transmit a reference signal.

The UE may transmit, to the base station, a result of the determination of whether a beam has failed (S1930). The result of the determination may be aperiodically transmitted from the physical layer to a higher layer. For example, the result of the determination may be transmitted based on one timing of i) a slot in which the DCI is received (plus a characteristic time offset), ii) a slot in which the reference signal triggered by the DCI is transmitted (plus a characteristic time offset) or iii) a slot in which a PUSCH or PUCCH assigned for the report is transmitted (plus a characteristic time offset).

FIG. 20 illustrates an example of an operational flowchart of a base station that performs beam failure detection to which a method proposed in the present disclosure may be applied. FIG. 20 is merely for convenience of description, and does not restrict the scope of the present disclosure.

Referring to FIG. 20, a case where a UE and/or a base station operates based on the methods and/or embodiments of the aforementioned method 1 to method 2 is assumed. Furthermore, it may be assumed that beam failure detection in an unlicensed band is performed. Some of steps described with reference to FIG. 20 may be merged or omitted.

The base station may transmit, to the UE, configuration information for a reference signal used to determine whether a beam has failed among multiple downlink reference signals (S2005). For example, multiple CSI-RS resources (set) may be configured through RRC or a MAC-CE, and one CSI-RS resource (set) to be used to determine whether a beam has failed may be indicated through DCI. This step may be omitted according to circumstances.

The base station may transmit a reference signal (RS) to the UE (S2010). The reference signal may be periodically or aperiodically transmitted. The reference signal may correspond to a reference signal triggered by downlink control information (DCI). For example, the reference signal triggered by the DCI may correspond to an aperiodic channel state information-RS (CSI-RS).

The base station may transmit, to the UE, information on a criterion (method) for determining whether a beam has failed (S2015). This step may be omitted according to circumstances. Furthermore, the steps S2005 and S2015 may be merged and performed in one step. The information on the determination criterion for determining whether a beam has failed may be configured in any one unit of a band, a component carrier (CC) or a bandwidth part (BWP). The information on the determination criterion for determining whether a beam has failed may include information that explicitly or implicitly indicates a beam failure detection method to be performed by the UE among multiple beam failure detection methods.

The base station may receive a result of the determination of whether a beam has failed from the UE (S2020). The result of the determination may be aperiodically received.

The determination of whether a beam has failed may be determined by the UE based on the reference signal. For example, a method of determining whether a beam has failed may be based on the aforementioned method 1 to method 2. The UE may divide the determination into i) a case where the base station does not transmit a reference signal and ii) a case where quality of a reference signal transmitted by the base station does not satisfy a specific threshold range, and may determine that the beam has failed only in the case ii). In other words, if the base station does not transmit a reference signal, although a measured value does not satisfy a specific threshold range, a beam may not be determined to have failed.

As a detailed example, whether a beam has failed may be determined based on one of reference signal received power (RSRP) or a block error rate (BLER) calculated by performing the measurement on the reference signal. If the RSRP is equal to or lower than a specific threshold, the i) case where the base station does not transmit a reference signal may be determine d. If whether a beam has failed is determined based on the BLER, a first threshold on which the i) case where the base station does not transmit a reference signal is determined and a second threshold on which the ii) quality of the reference signal transmitted by the base station is determined may be set. If the BLER is smaller than the first threshold and greater than the second threshold, a beam may be determined to have failed. If the BLER is greater than the first threshold, the i) case where the base station does not transmit a reference signal may be determined.

Through the aforementioned method, a case where a base station does not transmit a reference signal and a case corresponding to a beam failure due to poor quality of a reference signal are distinguished, and beam failure detection is performed. Accordingly, an unnecessary beam change can be prevented, and a power consumption problem can be solved.

Furthermore, the beam failure detection operations in an unlicensed band, which are performed by the base station and the UE in FIGS. 19 and 20, may be implemented by apparatuses of FIGS. 21 to 25 to be described hereinafter.

Overview of Devices to which Present Disclosure is Applicable

FIG. 21 illustrates an example of block diagram of a wireless communication device to which a method proposed in the present disclosure may be applied.

Referring to FIG. 21, a wireless communication system may include a first device 2110 and a second device 2120.

The first device 2110 may be a base station, a network node, a transmitting terminal, a receiving terminal, a transmitting device, a receiving device, a wireless device, a wireless communication device, a vehicle, a vehicle equipped with an autonomous driving function, a connected car, a unmanned aerial vehicle, UAV), an Artificial Intelligence (AI) module, a robot, an Augmented Reality (AR) device, a Virtual Reality (VR) device, a Mixed Reality (MR) device, a hologram device, a public safety device, an MTC device, an IoT device, a medical device, a pin-tec device (or financial device), a security device, a climate/environmental device, devices related to 5G services, or other devices related to fourth industrial revolution fields.

The second device 2120 may be a base station, a network node, a transmitting terminal, a receiving terminal, a transmitting device, a receiving device, a wireless device, a wireless communication device, a vehicle, a vehicle equipped with an autonomous driving function, a connected car, a unmanned aerial vehicle, UAV), an Artificial Intelligence (AI) module, a robot, an Augmented Reality (AR) device, a Virtual Reality (VR) device, a Mixed Reality (MR) device, a hologram device, a public safety device, an MTC device, an IoT device, a medical device, a pin-tec device (or financial device), a security device, a climate/environmental device, devices related to 5G services, or other devices related to fourth industrial revolution fields.

For example, the UE may include a cellular phone, a smart phone, a laptop computer, a digital broadcasting terminal, a personal digital assistants (PDA), a portable multimedia player (PMP), a navigation, a slate PC, a tablet PC, an ultrabook, a wearable device such as a smartwatch, a smart glass, or a head mounted display (HMD)), etc. For example, the HMD may be a display device worn on a head. For example, an HMD may be used to implement the VR, AR, or MR.

For example, the UAV may be a flying object that is not ridden by people but that flies by radio control signals. For example, the VR device may include a device that implements an object or background in a virtual world. For example, the AR device may include a device that connects and implements the object or background in the real world to the object or background in a real world. For example, the MR device may include a device that fuses and implements the object or background in the virtual world with the object or background in the real world. For example, the hologram device may include a device for implementing a 360-degree stereoscopic image by recording and reproducing stereoscopic information by utilizing a phenomenon of interference of light generated by the two laser lights meeting with each other, called holography. For example, the public safety device may include a video relay device or a video device that may be worn by a body of a user. For example, the MTC device and the IoT device may be a device which does not require direct human intervention or manipulation. For example, the MTC device and the IoT device may include a smart meter, a vending machine, a thermometer, a smart bulb, a door lock, or various sensors. For example, the medical device may be a device used for diagnosing, treating, alleviating, treating, or preventing a disease. For example, the medical device may be a device used for diagnosing, treating, alleviating, or correcting an injury or disability. For example, the medical device may be a device used for inspecting, replacing, or modifying a structure or function. For example, the medical device may be a device used for controlling pregnancy. For example, the medical device may include a medical treatment device, a surgical device, an (in vitro) diagnostic device, a hearing aid or a (medical) procedure device, and the like. For example, the security device may be a device installed to prevent a risk that may occur and to maintain safety. For example, the security device may be a camera, a CCTV, a recorder, or a black box. For example, the pin-tec device may be a device capable of providing financial services such as mobile payment. For example, the pin-tec device may include a payment device or a point of sales (POS). For example, the climate/environmental device may include a device for monitoring or predicting a climate/environment.

The first device 2110 may include at least one processor, such as a processor 2111, at least one memory, such as a memory 2112, and at least one transceiver, such as a transceiver 2113. The processor 2111 may perform the functions, procedures, and/or methods described above. The processor 2111 may perform one or more protocols. The processor 2111 may perform one or more layers of a radio interface protocol. The memory 2112 may be connected to the processor 2111 and store various types of information and/or commands. The transceiver 2113 may be connected to the processor 2111 and controlled to transmit/receive a radio signal.

As a detailed example, the processor 2111 may control the transceiver 2113 to transmit a reference signal to the second device 2120 (S2010). Furthermore, the processor 2111 may control the transceiver 2113 to receive a result of a determination of whether a beam has failed from the second device 2120 (S2020).

The second device 2120 may include at least one processor, such as a processor 2121, at least one memory, such as a memory 2122, and at least one transceiver, such as a transceiver 2123. The processor 2121 may perform the functions, procedures, and/or methods described above. The processor 2121 may implement one or more protocols. For example, the processor 2121 may implement one or more layers of the radio interface protocol. The memory 2122 may be connected to the processor 2121 and store various types of information and/or commands. The transceiver 2123 may be connected to the processor 2121 and controlled to transmit/receive a radio signal.

As a detailed example, the processor 2121 may control the transceiver 2123 to receive a reference signal from the first device 2110 (S1910). Furthermore, the processor 2121 may perform a determination of whether a beam has failed by performing measurement on the reference signal (S1920). Furthermore, the processor 2121 may control the transceiver 2123 to transmit a result of the determination of whether a beam has failed to the first device 2110 (S1930).

FIG. 22 illustrates another example of the block diagram of the wireless communication device to which a method proposed in the present disclosure may be applied.

Referring to FIG. 22, a wireless communication system includes an eNB 2210 and multiple user equipments 2220 positioned within coverage of the eNB. The eNB may be represented by a transmitting apparatus and the UE may be represented by a receiving apparatus, or vice versa. The eNB and the UE include processors 2211 and 2221, memories 2214 and 2224, one or more Tx/Rx radio frequency (RF) modules 2215 and 2225, Tx processors 2212 and 2222, Rx processors 2213 and 2223, and antennas 2216 and 2226, respectively. The processor implements a function, a process, and/or a method which are described above. More specifically, a higher layer packet from a core network is provided to the processor 2211 in DL (communication from the eNB to the UE). The processor implements a function of an L2 layer. In the DL, the processor provides multiplexing between a logical channel and a transmission channel and allocation of radio resources to the UE 2220, and takes charge of signaling to the UE. The transmit (TX) processor 2212 implement various signal processing functions for an L1 layer (i.e., physical layer). The signal processing functions facilitate forward error correction (FEC) at the UE and include coding and interleaving. Encoded and modulated symbols are divided into parallel streams, each stream is mapped to an OFDM subcarrier, multiplexed with a reference signal (RS) in a time and/or frequency domain, and combined together by using inverse fast Fourier transform (IFFT) to create a physical channel carrying a time domain OFDMA symbol stream. An OFDM stream is spatially precoded in order to create multiple spatial streams. Respective spatial streams may be provided to different antennas 2216 via individual Tx/Rx modules (or transceivers 2215). Each Tx/Rx module may modulate an RF carrier into each spatial stream for transmission. In the UE, each Tx/Rx module (or transceiver 2225) receives a signal through each antenna 2226 of each Tx/Rx module. Each Tx/Rx module reconstructs information modulated with the RF carrier and provides the reconstructed information to the receive (RX) processor 2223. The RX processor implements various signal processing functions of layer 1. The RX processor may perform spatial processing on information in order to reconstruct an arbitrary spatial stream which is directed for the UE. When multiple spatial streams are directed to the UE, the multiple spatial streams may be combined into a single OFDMA symbol stream by multiple RX processors. The RX processor transforms the OFDMA symbol stream from the time domain to the frequency domain by using fast Fourier transform (FFT). A frequency domain signal includes individual OFDMA symbol streams for respective subcarriers of the OFDM signal. Symbols on the respective subcarriers and the reference signal are reconstructed and demodulated by determining most likely signal arrangement points transmitted by the eNB. The soft decisions may be based on channel estimation values. The soft decisions are decoded and deinterleaved to reconstruct data and control signals originally transmitted by the eNB on the physical channel. The corresponding data and control signals are provided to the processor 2221.

UL (communication from the UE to the eNB) is processed by the eNB 2210 in a scheme similar to a scheme described in association with a receiver function in the UE 2220. Each Tx/Rx module 2225 receives the signal through each antenna 2226. Each Tx/Rx module provides the RF carrier and information to the RX processor 2223. The processor 2221 may be associated with the memory 2224 storing a program code and data. The memory may be referred to as a computer readable medium.

FIG. 23 illustrates an AI device 100 according to an embodiment of the present disclosure.

The AI device 100 may be implemented as a fixed device or mobile device, such as TV, a projector, a mobile phone, a smartphone, a desktop computer, a notebook, a terminal for digital broadcasting, a personal digital assistants (PDA), a portable multimedia player (PMP), a navigator, a tablet PC, a wearable device, a set-top box (STB), a DMB receiver, a radio, a washing machine, a refrigerator, a desktop computer, a digital signage, a robot, and a vehicle.

Referring to FIG. 23, the terminal 100 may include a communication unit 110, an input unit 120, a learning processor 130, a sensing unit 140, an output unit 150, a memory 170 and a processor 180.

The communication unit 110 may transmit and receive data to and from external devices, such as other AI devices 100*a* to 100*e* or an AI server 200, using wired and wireless communication technologies. For example, the communication unit 110 may transmit and receive sensor information, a user input, a learning model, and a control signal to and from external devices.

In this case, communication technologies used by the communication unit 110 include a global system for mobile communication (GSM), code division multi access (CDMA), long term evolution (LTE), 5G, a wireless LAN (WLAN), wireless-fidelity (Wi-Fi), Bluetooth™, radio frequency identification (RFID), infrared data association (IrDA), ZigBee, near field communication (NFC), etc.

The input unit 120 may obtain various types of data.

In this case, the input unit 120 may include a camera for an image signal input, a microphone for receiving an audio signal, a user input unit for receiving information from a user, etc. In this case, the camera or the microphone is treated as a sensor, and a signal obtained from the camera or the microphone may be called sensing data or sensor information.

The input unit 120 may obtain learning data for model learning and input data to be used when an output is obtained using a learning model. The input unit 120 may obtain not-processed input data. In this case, the processor 180 or the learning processor 130 may extract an input feature by performing pre-processing on the input data.

The learning processor 130 may be trained by a model configured with an artificial neural network using learning data. In this case, the trained artificial neural network may be called a learning model. The learning model is used to deduce a result value of new input data not learning data. The deduced value may be used as a base for performing a given operation.

In this case, the learning processor 130 may perform AI processing along with the learning processor 240 of the AI server 200.

In this case, the learning processor 130 may include memory integrated or implemented in the AI device 100. Alternatively, the learning processor 130 may be implemented using the memory 170, external memory directly coupled to the AI device 100 or memory maintained in an external device.

The sensing unit 140 may obtain at least one of internal information of the AI device 100, surrounding environment information of the AI device 100, or user information using various sensors.

In this case, sensors included in the sensing unit 140 include a proximity sensor, an illumination sensor, an acceleration sensor, a magnetic sensor, a gyro sensor, an inertia sensor, an RGB sensor, an IR sensor, a fingerprint recognition sensor, an ultrasonic sensor, a photo sensor, a microphone, LIDAR, and a radar.

The output unit 150 may generate an output related to a visual sense, an auditory sense or a tactile sense.

In this case, the output unit 150 may include a display unit for outputting visual information, a speaker for outputting auditory information, and a haptic module for outputting tactile information.

The memory 170 may store data supporting various functions of the AI device 100. For example, the memory 170 may store input data obtained by the input unit 120, learning data, a learning model, a learning history, etc.

The processor 180 may determine at least one executable operation of the AI device 100 based on information, determined or generated using a data analysis algorithm or a machine learning algorithm. Furthermore, the processor 180 may perform the determined operation by controlling elements of the AI device 100.

To this end, the processor 180 may request, search, receive, and use the data of the learning processor 130 or the memory 170, and may control elements of the AI device 100 to execute a predicted operation or an operation determined to be preferred, among the at least one executable operation.

In this case, if association with an external device is necessary to perform the determined operation, the processor 180 may generate a control signal for controlling the corresponding external device and transmit the generated control signal to the corresponding external device.

The processor 180 may obtain intention information for a user input and transmit user requirements based on the obtained intention information.

In this case, the processor 180 may obtain the intention information, corresponding to the user input, using at least one of a speech to text (STT) engine for converting a voice input into a text string or a natural language processing (NLP) engine for obtaining intention information of a natural language.

In this case, at least some of at least one of the STT engine or the NLP engine may be configured as an artificial neural network trained based on a machine learning algorithm. Furthermore, at least one of the STT engine or the NLP engine may have been trained by the learning processor 130, may have been trained by the learning processor 240 of the AI server 200 or may have been trained by distributed processing thereof.

The processor 180 may collect history information including the operation contents of the AI device 100 or the feedback of a user for an operation, may store the history information in the memory 170 or the learning processor 130, or may transmit the history information to an external device, such as the AI server 200. The collected history information may be used to update a learning model.

The processor 180 may control at least some of the elements of the AI device 100 in order to execute an application program stored in the memory 170. Moreover, the processor 180 may combine and drive two or more of the elements included in the AI device 100 in order to execute the application program.

FIG. 24 illustrates an AI server 200 according to an embodiment of the present disclosure.

Referring to FIG. 24, the AI server 200 may mean a device which is trained by an artificial neural network using a machine learning algorithm or which uses a trained artificial neural network. In this case, the AI server 200 is configured with a plurality of servers and may perform distributed processing and may be defined as a 5G network. In this case, the AI server 200 may be included as a partial configuration of the AI device 100, and may perform at least some of AI processing.

The AI server 200 may include a communication unit 210, a memory 230, a learning processor 240 and a processor 260.

The communication unit 210 may transmit and receive data to and from an external device, such as the AI device 100.

The memory 230 may include a model storage unit 231. The model storage unit 231 may store a model (or artificial neural network 231a) which is being trained or has been trained through the learning processor 240.

The learning processor 240 may train the artificial neural network 231a using learning data. The learning model may be used in the state in which it has been mounted on the AI server 200 of the artificial neural network or may be mounted on an external device, such as the AI device 100, and used.

The learning model may be implemented as hardware, software or a combination of hardware and software. If some of or the entire learning model is implemented as software, one or more instructions configuring the learning model may be stored in the memory 230.

The processor 260 may deduce a result value of new input data using the learning model, and may generate a response or control command based on the deduced result value.

FIG. 25 illustrates an AI system 1 according to an embodiment of the present disclosure.

Referring to FIG. 25, the AI system 1 is connected to at least one of the AI server 200, a robot 100a, a self-driving vehicle 100b, an XR device 100c, a smartphone 100d or home appliances 100e over a cloud network 10. In this case, the robot 100a, the self-driving vehicle 100b, the XR device 100c, the smartphone 100d or the home appliances 100e to which the AI technology has been applied may be called AI devices 100a to 100e.

The cloud network 10 may configure part of cloud computing infra or may mean a network present within cloud computing infra. In this case, the cloud network 10 may be configured using the 3G network, the 4G or long term evolution (LTE) network or the 5G network.

That is, the devices 100*a* to 100*e* (200) configuring the AI system 1 may be interconnected over the cloud network 10. Particularly, the devices 100*a* to 100*e* and 200 may communicate with each other through a base station, but may directly communicate with each other without the intervention of a base station.

The AI server 200 may include a server for performing AI processing and a server for performing calculation on big data.

The AI server 200 is connected to at least one of the robot 100*a*, the self-driving vehicle 100*b*, the XR device 100*c*, the smartphone 100*d* or the home appliances 100*e*, that is, AI devices configuring the AI system 1, over the cloud network 10, and may help at least some of the AI processing of the connected AI devices 100*a* to 100*e*.

In this case, the AI server 200 may train an artificial neural network based on a machine learning algorithm in place of the AI devices 100*a* to 100*e*, may directly store a learning model or may transmit the learning model to the AI devices 100*a* to 100*e*.

In this case, the AI server 200 may receive input data from the AI devices 100*a* to 100*e*, may deduce a result value of the received input data using the learning model, may generate a response or control command based on the deduced result value, and may transmit the response or control command to the AI devices 100*a* to 100*e*.

Alternatively, the AI devices 100*a* to 100*e* may directly deduce a result value of input data using a learning model, and may generate a response or control command based on the deduced result value.

Hereinafter, various embodiments of the AI devices 100*a* to 100*e* to which the above-described technology is applied are described. In this case, the AI devices 100*a* to 100*e* shown in FIG. 25 may be considered to be detailed embodiments of the AI device 100 shown in FIG. 23.

<AI and Robot to which the Methods Proposed in this Disclosure May be Applied>

An AI technology is applied to the robot 100*a*, and the robot 100*a* may be implemented as a guidance robot, a transport robot, a cleaning robot, a wearable robot, an entertainment robot, a pet robot, an unmanned flight robot, etc.

The robot 100*a* may include a robot control module for controlling an operation. The robot control module may mean a software module or a chip in which a software module has been implemented using hardware.

The robot 100*a* may obtain state information of the robot 100*a*, may detect (recognize) a surrounding environment and object, may generate map data, may determine a moving path and a running plan, may determine a response to a user interaction, or may determine an operation using sensor information obtained from various types of sensors.

In this case, the robot 100*a* may use sensor information obtained by at least one sensor among LIDAR, a radar, and a camera in order to determine the moving path and running plan.

The robot 100*a* may perform the above operations using a learning model configured with at least one artificial neural network. For example, the robot 100*a* may recognize a surrounding environment and object using a learning model, and may determine an operation using recognized surrounding environment information or object information. In this case, the learning model may have been directly trained in the robot 100*a* or may have been trained in an external device, such as the AI server 200.

In this case, the robot 100*a* may directly generate results using the learning model and perform an operation, but may perform an operation by transmitting sensor information to an external device, such as the AI server 200, and receiving results generated in response thereto.

The robot 100*a* may determine a moving path and running plan using at least one of map data, object information detected from sensor information, or object information obtained from an external device. The robot 100*a* may run along the determined moving path and running plan by controlling the driving unit.

The map data may include object identification information for various objects disposed in the space in which the robot 100*a* moves. For example, the map data may include object identification information for fixed objects, such as a wall and a door, and movable objects, such as a flowport and a desk. Furthermore, the object identification information may include a name, a type, a distance, a location, etc.

Furthermore, the robot 100*a* may perform an operation or run by controlling the driving unit based on a user's control/interaction. In this case, the robot 100*a* may obtain intention information of an interaction according to a user's behavior or voice speaking, may determine a response based on the obtained intention information, and may perform an operation.

<AI and Self-Driving to which the Methods Proposed in this Disclosure May be Applied>

An AI technology is applied to the self-driving vehicle 100*b*, and the self-driving vehicle 100*b* may be implemented as a movable type robot, a vehicle, an unmanned flight body, etc.

The self-driving vehicle 100*b* may include a self-driving control module for controlling a self-driving function. The self-driving control module may mean a software module or a chip in which a software module has been implemented using hardware. The self-driving control module may be included in the self-driving vehicle 100*b* as an element of the self-driving vehicle 100*b*, but may be configured as separate hardware outside the self-driving vehicle 100*b* and connected to the self-driving vehicle 100*b*.

The self-driving vehicle 100*b* may obtain state information of the self-driving vehicle 100*b*, may detect (recognize) a surrounding environment and object, may generate map data, may determine a moving path and running plan, or may determine an operation using sensor information obtained from various types of sensors.

In this case, in order to determine the moving path and running plan, like the robot 100*a*, the self-driving vehicle 100*b* may use sensor information obtained from at least one sensor among LIDAR, a radar and a camera.

Particularly, the self-driving vehicle 100*b* may recognize an environment or object in an area whose view is blocked or an area of a given distance or more by receiving sensor information for the environment or object from external devices, or may directly receive recognized information for the environment or object from external devices.

The self-driving vehicle 100*b* may perform the above operations using a learning model configured with at least one artificial neural network. For example, the self-driving vehicle 100*b* may recognize a surrounding environment and object using a learning model, and may determine the flow of running using recognized surrounding environment information or object information. In this case, the learning model may have been directly trained in the self-driving vehicle 100*b* or may have been trained in an external device, such as the AI server 200.

In this case, the self-driving vehicle 100*b* may directly generate results using the learning model and perform an operation, but may perform an operation by transmitting sensor information to an external device, such as the AI server 200, and receiving results generated in response thereto.

The self-driving vehicle 100b may determine a moving path and running plan using at least one of map data, object information detected from sensor information or object information obtained from an external device. The self-driving vehicle 100b may run based on the determined moving path and running plan by controlling the driving unit.

The map data may include object identification information for various objects disposed in the space (e.g., road) in which the self-driving vehicle 100b runs. For example, the map data may include object identification information for fixed objects, such as a streetlight, a rock, and a building, etc., and movable objects, such as a vehicle and a pedestrian. Furthermore, the object identification information may include a name, a type, a distance, a location, etc.

Furthermore, the self-driving vehicle 100b may perform an operation or may run by controlling the driving unit based on a user's control/interaction. In this case, the self-driving vehicle 100b may obtain intention information of an interaction according to a user' behavior or voice speaking, may determine a response based on the obtained intention information, and may perform an operation.

<AI and XR to which the Methods Proposed in this Disclosure May be Applied>

An AI technology is applied to the XR device 100c, and the XR device 100c may be implemented as a head-mount display, a head-up display provided in a vehicle, television, a mobile phone, a smartphone, a computer, a wearable device, home appliances, a digital signage, a vehicle, a fixed type robot or a movable type robot.

The XR device 100c may generate location data and attributes data for three-dimensional points by analyzing three-dimensional point cloud data or image data obtained through various sensors or from an external device, may obtain information on a surrounding space or real object based on the generated location data and attributes data, and may output an XR object by rendering the XR object. For example, the XR device 100c may output an XR object, including additional information for a recognized object, by making the XR object correspond to the corresponding recognized object.

The XR device 100c may perform the above operations using a learning model configured with at least one artificial neural network. For example, the XR device 100c may recognize a real object in three-dimensional point cloud data or image data using a learning model, and may provide information corresponding to the recognized real object. In this case, the learning model may have been directly trained in the XR device 100c or may have been trained in an external device, such as the AI server 200.

In this case, the XR device 100c may directly generate results using a learning model and perform an operation, but may perform an operation by transmitting sensor information to an external device, such as the AI server 200, and receiving results generated in response thereto.

<AI, Robot and Self-Driving to which the Methods Proposed in this Disclosure May be Applied>

An AI technology and a self-driving technology are applied to the robot 100a, and the robot 100a may be implemented as a guidance robot, a transport robot, a cleaning robot, a wearable robot, an entertainment robot, a pet robot, an unmanned flight robot, etc.

The robot 100a to which the AI technology and the self-driving technology have been applied may mean a robot itself having a self-driving function or may mean the robot 100a interacting with the self-driving vehicle 100b.

The robot 100a having the self-driving function may collectively refer to devices that autonomously move along a given flow without control of a user or autonomously determine a flow and move.

The robot 100a and the self-driving vehicle 100b having the self-driving function may use a common sensing method in order to determine one or more of a moving path or a running plan. For example, the robot 100a and the self-driving vehicle 100b having the self-driving function may determine one or more of a moving path or a running plan using information sensed through LIDAR, a radar, a camera, etc.

The robot 100a interacting with the self-driving vehicle 100b is present separately from the self-driving vehicle 100b, and may perform an operation associated with a self-driving function inside or outside the self-driving vehicle 100b or associated with a user got in the self-driving vehicle 100b.

In this case, the robot 100a interacting with the self-driving vehicle 100b may control or assist the self-driving function of the self-driving vehicle 100b by obtaining sensor information in place of the self-driving vehicle 100b and providing the sensor information to the self-driving vehicle 100b, or by obtaining sensor information, generating surrounding environment information or object information, and providing the surrounding environment information or object information to the self-driving vehicle 100b.

Alternatively, the robot 100a interacting with the self-driving vehicle 100b may control the function of the self-driving vehicle 100b by monitoring a user got in the self-driving vehicle 100b or through an interaction with a user. For example, if a driver is determined to be a drowsiness state, the robot 100a may activate the self-driving function of the self-driving vehicle 100b or assist control of the driving unit of the self-driving vehicle 100b. In this case, the function of the self-driving vehicle 100b controlled by the robot 100a may include a function provided by a navigation system or audio system provided within the self-driving vehicle 100b, in addition to a self-driving function simply.

Alternatively, the robot 100a interacting with the self-driving vehicle 100b may provide information to the self-driving vehicle 100b or may assist a function outside the self-driving vehicle 100b. For example, the robot 100a may provide the self-driving vehicle 100b with traffic information, including signal information, as in a smart traffic light, and may automatically connect an electric charger to a filling inlet through an interaction with the self-driving vehicle 100b as in the automatic electric charger of an electric vehicle.

<AI, Robot and XR to which the Methods Proposed in this Disclosure May be Applied>

An AI technology and an XR technology are applied to the robot 100a, and the robot 100a may be implemented as a guidance robot, a transport robot, a cleaning robot, a wearable robot, an entertainment robot, a pet robot, an unmanned flight robot, a drone, etc.

The robot 100a to which the XR technology has been applied may mean a robot, that is, a target of control/interaction within an XR image. In this case, the robot 100a is different from the XR device 100c, and they may operate in conjunction with each other.

When the robot 100a, that is, a target of control/interaction within an XR image, obtains sensor information from sensors including a camera, the robot 100a or the XR device 100c may generate an XR image based on the sensor information, and the XR device 100*c* may output the generated XR image. Furthermore, the robot 100*a* may operate based on a control signal received through the XR device 100*c* or a user's interaction.

For example, a user may identify a corresponding XR image at timing of the robot 100*a*, remotely operating in conjunction through an external device, such as the XR device 100*c*, may adjust the self-driving path of the robot 100*a* through an interaction, may control an operation or driving, or may identify information of a surrounding object.

<AI, Self-Driving and XR to which the Methods Proposed in this Disclosure May be Applied>

An AI technology and an XR technology are applied to the self-driving vehicle 100*b*, and the self-driving vehicle 100*b* may be implemented as a movable type robot, a vehicle, an unmanned flight body, etc.

The self-driving vehicle 100*b* to which the XR technology has been applied may mean a self-driving vehicle equipped with means for providing an XR image or a self-driving vehicle, that is, a target of control/interaction within an XR image. Particularly, the self-driving vehicle 100*b*, that is, a target of control/interaction within an XR image, is different from the XR device 100*c*, and they may operate in conjunction with each other.

The self-driving vehicle 100*b* equipped with the means for providing an XR image may obtain sensor information from sensors including a camera, and may output an XR image generated based on the obtained sensor information. For example, the self-driving vehicle 100*b* includes an HUD, and may provide a passenger with an XR object corresponding to a real object or an object within a screen by outputting an XR image.

In this case, when the XR object is output to the HUD, at least some of the XR object may be output with it overlapping a real object toward which a passenger's view is directed. In contrast, when the XR object is displayed on a display included within the self-driving vehicle 100*b*, at least some of the XR object may be output so that it overlaps an object within a screen. For example, the self-driving vehicle 100*b* may output XR objects corresponding to objects, such as a carriageway, another vehicle, a traffic light, a signpost, a two-wheeled vehicle, a pedestrian, and a building.

When the self-driving vehicle 100*b*, that is, a target of control/interaction within an XR image, obtains sensor information from sensors including a camera, the self-driving vehicle 100*b* or the XR device 100*c* may generate an XR image based on the sensor information. The XR device 100*c* may output the generated XR image. Furthermore, the self-driving vehicle 100*b* may operate based on a control signal received through an external device, such as the XR device 100*c*, or a user's interaction.

The embodiments described above are implemented by combinations of components and features of the disclosure in predetermined forms. Each component or feature should be considered selectively unless specified separately. Each component or feature may be carried out without being combined with another component or feature. Moreover, some components and/or features are combined with each other and may implement embodiments of the disclosure. The order of operations described in embodiments of the disclosure may be changed. Some components or features of one embodiment may be included in another embodiment, or may be replaced by corresponding components or features of another embodiment. It is apparent that some claims referring to a specific claim may be combined with another claim referring to the claims other than the specific claim to constitute the embodiment or add new claims by means of amendment after the application is filed.

Embodiments of the disclosure may be implemented by various means, for example, hardware, firmware, software, or combinations thereof. When embodiments are implemented by hardware, one embodiment of the disclosure may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the disclosure may be implemented by modules, procedures, functions, etc. Performing functions or operations described above. Software code may be stored in a memory and may be driven by a processor. The memory is provided inside or outside the processor and may exchange data with the processor by various well-known means.

It is apparent to those skilled in the art that the disclosure may be embodied in other specific forms without departing from essential features of the disclosure. Accordingly, the aforementioned detailed description should not be construed as limiting in all aspects and should be considered as illustrative. The scope of the disclosure should be determined by rational construing of the appended claims, and all modifications within an equivalent scope of the disclosure are included in the scope of the disclosure.

INDUSTRIAL APPLICABILITY

Although a method for transmitting channel state information in a wireless communication system of the present disclosure has been described with reference to an example applied to a 3GPP LTE/LTE-A system or a 5G system (New RAT system), the method may be applied to various wireless communication systems in addition to the 3GPP LTE/LTE-A system or 5G system.

What is claimed is:

1. A method of performing, by a user equipment (UE), beam failure detection in a wireless communication system, the method comprising:

receiving a reference signal (RS) from a base station;

determining whether a beam has failed based on a block error rate (BLER) calculated by performing measurement on the reference signal; and transmitting, to the base station, a result of the determination of whether the beam has failed, wherein determining whether the beam has failed includes:

distinguishing between i) a case where the base station does not transmit the reference signal and ii) a case where quality of the reference signal transmitted by the base station does not satisfy a specific threshold range, and determining that the beam has failed only in the case ii), wherein a first threshold for determining the case i) where the base station does not transmit the reference signal and a second threshold for determining the case ii) where the quality of the reference signal transmitted by the base station are separately set.

2. The method of claim 1, wherein the reference signal is a reference signal triggered by downlink control information (DCI).

3. The method of claim 2,
wherein the reference signal triggered by the DCI corresponds to an aperiodic channel state information-RS (CSI-RS).

4. The method of claim 2,
wherein the result of the determination is aperiodically transmitted from a physical layer to a higher layer.

5. The method of claim 4,
wherein the result of the determination is transmitted based on one timing of i) a slot in which the DCI is received, ii) a slot in which the reference signal triggered by the DCI is transmitted or iii) a slot in which a PUSCH or PUCCH assigned for the report is transmitted.

6. The method of claim 1,
wherein when the BLER is smaller than the first threshold and greater than the second threshold, the beam failure is determined.

7. The method of claim 1,
wherein when the BLER is greater than the first threshold, the case i) where the base station does not transmit the reference signal is determined.

8. The method of claim 1, further comprising receiving, from the base station, information on a determination criterion for determining whether a beam has failed.

9. The method of claim 8,
wherein the information on the determination criterion for determining whether a beam has failed is configured in any one unit of a band, a component carrier (CC) or a bandwidth part (BWP).

10. The method of claim 1, further comprising receiving, from the base station, a reference signal to be used to determine whether a beam has failed among multiple downlink reference signals and/or configuration information for a determination method.

11. The method of claim 1,
wherein the beam failure detection is performed in an unlicensed band.

12. A user equipment (UE) performing beam failure detection in a wireless communication system, the UE comprising:
a transceiver for transmitting and receiving radio signals, and
a processor functionally connected to the transceiver,
wherein the processor is configured to:
control the transceiver to receive a reference signal (RS) from a base station,
determine whether a beam has failed based on a block error rate (BLER) calculated by performing measurement on the reference signal, and
control the transceiver to transmit, to the base station, a result of the determination of whether the beam has failed,
wherein determining whether the beam has failed includes:
distinguish between i) a case where the base station does not transmit the reference signal and ii) a case where quality of the reference signal transmitted by the base station does not satisfy a specific threshold range, and determining that the beam has failed only in the case ii),
wherein a first threshold for determining the case i) where the base station does not transmit the reference signal and a second threshold for determining the case ii) where the quality of the reference signal transmitted by the base station are separately set.

\* \* \* \* \*